US009883462B2

(12) United States Patent
Lee et al.

(10) Patent No.: US 9,883,462 B2
(45) Date of Patent: Jan. 30, 2018

(54) ELECTRONIC DEVICE AND POWER BACK OFF CONTROL METHOD THEREOF

(71) Applicant: SAMSUNG ELECTRONICS CO., LTD., Suwon-si, Gyeonggi-do (KR)

(72) Inventors: Sung-Min Lee, Seoul (KR); Seung-In Kang, Suwon-si (KR); Jung-Min Park, Suwon-si (KR); Han-Jun Yi, Seongnam-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 0 days.

(21) Appl. No.: 15/347,942

(22) Filed: Nov. 10, 2016

(65) Prior Publication Data

US 2017/0164300 A1 Jun. 8, 2017

(30) Foreign Application Priority Data

Dec. 8, 2015 (KR) ........................ 10-2015-0174326

(51) Int. Cl.
*H04B 1/00* (2006.01)
*H04B 7/00* (2006.01)
(Continued)

(52) U.S. Cl.
CPC ............ *H04W 52/18* (2013.01); *H01Q 1/245* (2013.01); *H04L 43/16* (2013.01); *H04W 4/026* (2013.01); *H04W 4/027* (2013.01); *H04B 1/3838* (2013.01)

(58) Field of Classification Search
CPC .............................. H04B 1/3838; H04W 52/18
(Continued)

(56) References Cited

U.S. PATENT DOCUMENTS

| 8,775,103 | B1 * | 7/2014 | Jayaraj | ................. | H03K 17/955 |
| | | | | | 702/57 |
| 2003/0064761 | A1 * | 4/2003 | Nevermann | ......... | H04B 1/3838 |
| | | | | | 455/572 |

(Continued)

FOREIGN PATENT DOCUMENTS

| JP | 2015-061296 | 3/2015 |
| KR | 10-2014-0142862 | 12/2014 |
| KR | 10-2015-0019352 | 2/2015 |

*Primary Examiner* — Tilahun B Gesesse
(74) *Attorney, Agent, or Firm* — Nixon & Vanderhye P.C.

(57) ABSTRACT

According to various embodiments, an electronic device comprises: a housing including a first surface, a second surface facing in the opposite direction of the first surface, and side surfaces that surround at least a part of a space between the first surface and the second surface; a first sensor and a second sensor which are disposed in the housing or exposed through at least one surface; a communication circuit disposed in the housing; an antenna radiator electrically connected with the communication circuit; and a control circuit electrically connected with at least one of the first and second sensors, and the communication circuit, wherein the control circuit is configured to: transmit or receive, to or from an external device, a first signal output from the communication circuit, using the antenna radiator; detect, using the first sensor, whether an external object has approached within a predetermined distance at least a part of the antenna radiator to generate a second signal; detect, using the second sensor, an orientation of the electronic device to generate a third signal; and decrease the strength of the first signal, based on at least a part of the generated second signal and third signal.

20 Claims, 11 Drawing Sheets

(51) Int. Cl.
  *H04W 52/18*    (2009.01)
  *H04W 4/02*     (2009.01)
  *H01Q 1/24*     (2006.01)
  *H04L 12/26*    (2006.01)
  *H04B 1/3827*   (2015.01)

(58) Field of Classification Search
  USPC .................. 455/522, 67, 11, 63.1, 226.1
  See application file for complete search history.

(56) References Cited

U.S. PATENT DOCUMENTS

| | | | | |
|---|---|---|---|---|
| 2005/0001774 A1* | 1/2005 | Woodward | ............ | H01Q 1/245 343/702 |
| 2011/0134004 A1* | 6/2011 | Takatsuka | ............ | H01Q 1/1264 343/757 |
| 2011/0267239 A1* | 11/2011 | Mashima | ................ | H01Q 1/243 343/702 |
| 2012/0075159 A1* | 3/2012 | Chang | ...................... | H01Q 1/24 343/860 |
| 2012/0077538 A1* | 3/2012 | Yun | ...................... | H04B 1/3838 455/522 |
| 2012/0214422 A1* | 8/2012 | Shi | ...................... | H04B 1/3838 455/67.11 |
| 2012/0218195 A1* | 8/2012 | Koh | ...................... | G06F 1/169 345/173 |
| 2014/0098693 A1* | 4/2014 | Tabet | ................ | H04W 36/0083 370/252 |
| 2014/0361979 A1 | 12/2014 | Woo et al. | | |
| 2016/0195986 A1 | 7/2016 | Kwon et al. | | |
| 2016/0211876 A1* | 7/2016 | Yamamoto | ............ | H04B 1/3838 |

* cited by examiner

ELECTRONIC DEVICE AND POWER BACK OFF CONTROL METHOD THEREOF

CROSS-REFERENCE TO RELATED APPLICATION

This application is based on and claims priority under 35 U.S.C. §119 to Korean Application Serial No. 10-2015-0174326, which was filed in the Korean Intellectual Property Office on Dec. 8, 2015, the content of which is incorporated by reference herein in its entirety.

TECHNICAL FIELD

The present disclosure relates generally to an electronic device and a power back off control method thereof.

BACKGROUND

A recent portable electronic device may provide various wireless communications such as mobile communication or data communication. For example, portable electronic devices such as a cellular phone, a smart phone, or a tablet computer have been developed in order to provide more convenience to a user while implementing various functions including a mobile communication function, a camera function, a video reproduction function, a web browser, wireless communication, etc.

For example, in order to minimize or reduce the influence of electromagnetic waves of a signal generated by an antenna of the electronic device when performing various wireless communications such as the wireless mobile communication and data communication, a portable electronic device may detect whether a human body approaches or is in proximity of the antenna, using a predetermined sensor (e.g., a grip sensor, etc.) and perform an output power back off function for decreasing the strength of the signal generated by the antenna when the human body approaches the antenna.

According to a conventional technology, a grip sensor disposed in an electronic device to detect whether or not the electronic device is in contact with a human body may have a possibility to malfunction due to different recognition rates of detecting whether there is a contact with a human body for each surface of the electronic device, and incorrectly perform an output power back off function. Such malfunction of the grip sensor may be a cause of deteriorating performance of an antenna.

SUMMARY

Various example embodiments of the present disclosure may provide, for example, an electronic device and an output power back off control method thereof, an electronic device that can determine a surface of the electronic device with which a human body is in contact, in response to different recognition rates of a grip sensor for each surface of the electronic device to prevent and/or reduce a malfunction of the grip sensor, and maximize and/or improve performance of an antenna while minimizing and/or reducing the influence of electromagnetic waves on the human body.

According to various example embodiments, an electronic device may include: a housing including a first surface, a second surface facing in the opposite direction of the first surface, and side surfaces that surround at least a part of a space between the first surface and the second surface; a first sensor and a second sensor which are disposed inside the housing or exposed through at least one surface; a communication circuit disposed inside the housing; an antenna radiator electrically connected with the communication circuit; and a control circuit electrically connected with at least one sensor of the first and second sensors, and the communication circuit, wherein the control circuit is configured to: transmit or receive, to or from an external device, a first signal output from the communication circuit, using the antenna radiator; detect, using the first sensor, whether an external object has approached or is within a predetermined distance of at least a part of the antenna radiator to generate a second signal; detect, using the second sensor, an orientation of the electronic device to generate a third signal; and decrease the strength of the first signal based on at least a part of the generated second signal and third signal.

According to various example embodiments, an electronic device may include: a housing including a first surface facing a first direction, a second surface facing a second direction opposite to the first direction, and side surfaces that surround at least a part of a space between the first surface and the second surface; a first sensor and a second sensor which are disposed inside the housing or exposed through at least one surface; a communication circuit disposed inside the housing; an antenna radiator electrically connected with the communication circuit; and a control circuit electrically connected with at least one of the first and second sensors, the communication circuit, and the antenna radiator, wherein the control circuit is configured to: transmit or receive a first signal to or from an external device, using the communication circuit; detect, using the first sensor, whether an external object has approached or is within a predetermined distance of at least a part of the antenna radiator to generate a second signal; detect, using the second sensor, whether the external object has approached or is within a predetermined distance of at least some of surfaces of the housing to generate a third signal; and determine whether to decrease the strength of the first signal based on the generated second signal and third signal.

According to various example embodiments, an output power back off control method in an electronic device may include the operations of: transmitting or receiving, to or from an external device, a first signal output from a communication circuit disposed inside a housing of the electronic device, using an antenna radiator electrically connected with the communication circuit; detecting whether an external object has approached or is within a predetermined distance of at least a part of the antenna radiator, using a first sensor disposed inside the housing or exposed through at least one surface, to generate a second signal; detecting an orientation of the electronic device, using a second sensor disposed inside the housing or exposed through at least one surface, to generate a third signal; and decreasing the strength of the first signal based on at least a part of the generated second signal and third signal.

According to various embodiments, an output power back off control method in an electronic device may include the operations of: transmitting or receiving a first signal to or from an external device, using a communication circuit disposed inside a housing of the electronic device; detecting whether an external object has approached or is within a predetermined distance of at least a part of an antenna radiator electrically connected with the communication circuit, using a first sensor disposed inside the housing or exposed through at least one surface, to generate a second signal; detecting whether the external object has approached or is within a predetermined distance of at least some of surfaces of the housing, using a second sensor disposed inside the housing or exposed through at least one surface, to generate a third signal; and determining whether to decrease the strength of the first signal based on the generated second signal and third signal.

According to various example embodiments of the present disclosure, for example, a malfunction of a grip sensor can be prevented and/or reduced by configuring threshold values of the grip sensor corresponding to surfaces to be different from each other in response to different recognition rates of the grip sensor for each surface (e.g., the front surface (FF: front face), the rear surface (BF: back face), and the side surface (SF: side face)) of an electronic device, using the grip sensor of the electronic device to determine a side of surfaces of the electronic device, which is in contact with a human body.

Also, for example, the influence of electromagnetic waves of output power on a human body can be minimized and/or reduced by decreasing, as much as the amount of a predetermined output power back off value in response to the orientation, the strength of the output power generated from an antenna based on an orientation (e.g., in a case of the front surface FF direction of the electronic device) of the electronic device, toward which the human body approaches.

Also, for example, communication efficiency can be maximized and/or increased and/or improved without substantially deteriorating performance of an antenna, by maintaining the strength of output power generated from the antenna based on an orientation (e.g., in a case of a direction expect for the front surface FF of the electronic device, i.e., one of the rear surface BF direction and side surface SF direction of the electronic device) of the electronic device, toward which a human body approaches.

BRIEF DESCRIPTION OF THE DRAWINGS

The above and other aspects, features, and advantages of the present disclosure will become more apparent from the following detailed description, taken in conjunction with the accompanying drawings, in which like reference numerals refer to like elements, and wherein.

DETAILED DESCRIPTION

Figure 1:
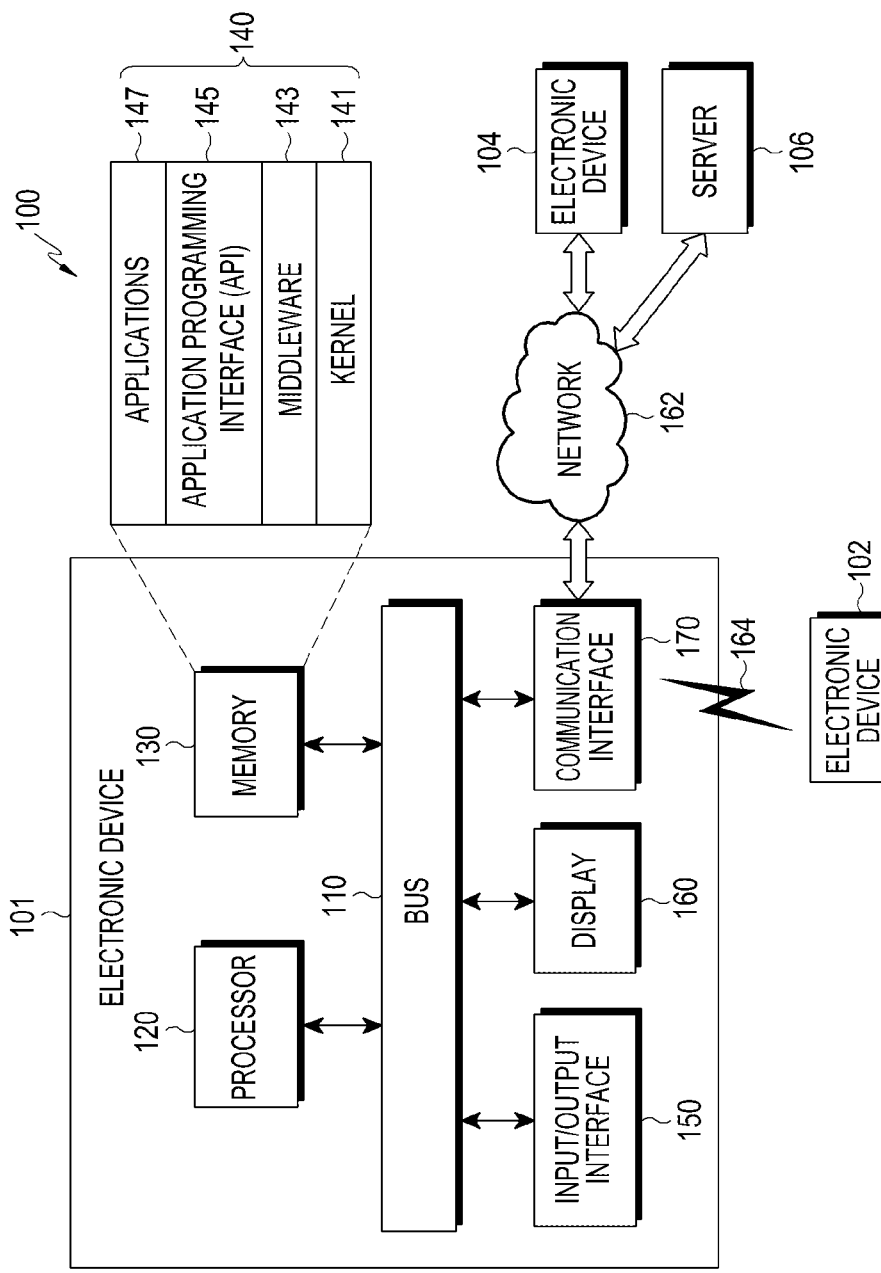
FIG. 1 is a diagram illustrating an example network environment system according to various example embodiments.

Hereinafter, various example embodiments of the present disclosure will be described with reference to the accompanying drawings. However, it should be understood that there is no intent to limit the present disclosure to the particular forms disclosed herein; rather, the present disclosure should be construed to cover various modifications, equivalents, and/or alternatives of embodiments of the present disclosure. In describing the drawings, similar reference numerals may be used to designate similar constituent elements.

In the present disclosure, the expression "have", "may have", "include" or "may include" refers to the existence of a corresponding feature (e.g., numerical value, function, operation, or components such as elements), and does not exclude the existence of additional features.

In the present disclosure, the expression "A or B", "at least one of A or/and B", or "one or more of A or/and B" may include all possible combinations of the items listed. For example, the expression "A or B", "at least one of A and B", or "at least one of A or B" refers to all of (1) including at least one A, (2) including at least one B, or (3) including all of at least one A and at least one B.

The expression "a first", "a second", "the first", or "the second" used in various embodiments of the present disclosure may modify various components regardless of the order and/or the importance but does not limit the corresponding components. For example, a first user device and a second user device may indicate different user devices regardless sequence or importance thereof. For example, a first element may be termed a second element, and similarly, a second element may be termed a first element without departing from the scope of the present disclosure.

It should be understood that when an element (e.g., first element) is referred to as being (operatively or communicatively) "connected," or "coupled," to another element (e.g., second element), it may be directly connected or coupled directly to the other element or any other element (e.g., third element) may be interposer between them. In contrast, it may be understood that when an element (e.g., first element) is referred to as being "directly connected," or "directly coupled" to another element (second element), there is no element (e.g., third element) interposed between them.

As used herein, the expression "configured to" may be interchangeably used with the expression "suitable for", "having the capability to", "designed to", "adapted to", "made to", or "capable of". The term "configured to" may not necessarily imply "specifically designed to" in hardware. Alternatively, in some situations, the expression "device configured to" may for example include that the device, together with other devices or components, "is able to". For example, the phrase "processor adapted (or configured) to perform A, B, and C" may refer, for example, to a dedicated processor (e.g. embedded processor) only for performing the corresponding operations or a generic-purpose processor (e.g., CPU or application processor) that can perform the corresponding operations by executing one or more software programs stored in a memory device.

The terms used herein are merely for the purpose of describing particular embodiments and are not intended to limit the scope of other embodiments. As used herein, singular forms may include plural forms as well unless the context clearly indicates otherwise. Unless defined otherwise, all terms used herein, including technical and scientific terms, have the same meaning as those commonly understood by a person skilled in the art to which the present disclosure pertains. Such terms as those defined in a generally used dictionary may be interpreted to have the meanings equal to the contextual meanings in the relevant field of art, and are not to be interpreted to have ideal or excessively formal meanings unless clearly defined in the present disclosure. In some cases, even the term defined in the present disclosure should not be interpreted to exclude embodiments of the present disclosure.

An electronic device according to various example embodiments of the present disclosure may include at least one of, for example, a smart phone, a tablet Personal Computer (PC), a mobile phone, a video phone, an electronic book reader (e-book reader), a desktop PC, a laptop PC, a netbook computer, a workstation, a server, a Personal Digital Assistant (PDA), a Portable Multimedia Player (PMP), an MP3 player, a mobile medical device, a camera, and a wearable device. According to various embodiments, the wearable device may include at least one of an accessory type (e.g., a watch, a ring, a bracelet, an anklet, a necklace, glasses, a contact lens, or a Head-Mounted Device (HMD)), a fabric or clothing integrated type (e.g., an electronic clothing), a body-mounted type (e.g., a skin pad, or tattoo), and a bio-implantable type (e.g., an implantable circuit), or the like, but is not limited thereto.

According to some example embodiments, the electronic device may be a home appliance. The home appliance may include at least one of, for example, a television, a Digital Video Disc (DVD) player, an audio, a refrigerator, an air conditioner, a vacuum cleaner, an oven, a microwave oven, a washing machine, an air cleaner, a set-top box, a home automation control panel, a security control panel, a TV box (e.g., Samsung HomeSync™, Apple TV™, or Google TV™), a game console (e.g., Xbox™ and PlayStation™), an electronic dictionary, an electronic key, a camcorder, and an electronic photo frame, or the like, but is not limited thereto.

According to another example embodiment, the electronic device may include at least one of various medical devices (e.g., various portable medical measuring devices (a blood glucose monitoring device, a heart rate monitoring device, a blood pressure measuring device, a body temperature measuring device, etc.), a Magnetic Resonance Angiography (MRA), a Magnetic Resonance Imaging (MRI), a Computed Tomography (CT) machine, and an ultrasonic machine), a navigation device, a Global Navigation Satellite System (GNSS), an Event Data Recorder (EDR), a Flight Data Recorder (FDR), a Vehicle Infotainment Devices, an electronic devices for a ship (e.g., a navigation device for a ship, and a gyro-compass), avionics, security devices, an automotive head unit, a robot for home or industry, an automatic teller's machine (ATM) in banks, a point of sales (POS) device in a shop, or an Internet of Things device (e.g., a light bulb, various sensors, electric or gas meter, a sprinkler device, a fire alarm, a thermostat, a streetlamp, a toaster, sporting goods, a hot water tank, a heater, a boiler, etc.), or the like, but is not limited thereto.

According to some example embodiments, the electronic device may include at least one of a piece of furniture or a building/structure, an electronic board, an electronic signature receiving device, a projector, and various kinds of measuring instruments (e.g., a water meter, an electric meter, a gas meter, and a radio wave meter), or the like, but is not limited thereto. In various example embodiments, the electronic device may be a combination of one or more of the aforementioned various devices. According to some example embodiments, the electronic device may also be a flexible device. Further, the electronic device according to an example embodiment of the present disclosure is not limited to the aforementioned devices, and may include a new electronic device according to the development of technology.

Hereinafter, an electronic device according to various example embodiments will be described with reference to the accompanying drawings. In the present disclosure, the term "user" may indicate a person using an electronic device or a device (e.g., an artificial intelligence electronic device) using an electronic device.

Referring to FIG. 1, an electronic device 101 within a network environment 100 according to various example embodiments will be described. The electronic device 101 may include a bus 110, a processor 120, a memory 130, an input/output interface (e.g., including input/output circuitry) 150, a display 160, and a communication interface (e.g., including communication circuitry) 170. In some example embodiments, the electronic device 101 may omit at least one of the elements, or may further include other elements.

The bus 110 may include, for example, a circuit that connects the elements 120, 130, and 150 to 170 and transfers communication (e.g., control messages and/or data) between the elements.

The processor 120 may include one or more of a Central Processing Unit (CPU), an Application Processor (AP), and a Communication Processor (CP). For example, the processor 120 may carry out operations or data processing relating to the control and/or communication of at least one other element of the electronic device 101. The processor 120 may be called a controller, or may include a controller as a part thereof or constitute a part of the controller.

The memory 130 may include a volatile and/or non-volatile memory. The memory 130 may store, for example, instructions or data relating to at least one other element of the electronic device 101. According to an embodiment, the memory 130 may store software and/or a program 140. The program 140 may include a kernel 141, middleware 143, an Application Programming Interface (API) 145, and/or application programs (or "applications") 147. At least some of the kernel 141, the middleware 143, and the API 145 may be referred to as an Operating System (OS).

For example, the kernel 141 may control or manage the system resources (e.g., the bus 110, the processor 120, the memory 130, etc.) that are used to execute operations or functions implemented in the other programs (e.g., the middleware 143, the API 145, and the application programs 147). Furthermore, the kernel 141 may provide an interface through which the middleware 143, the API 145, or the application programs 147 may access the individual elements of the electronic device 101 to control or manage the system resources.

The middleware 143 may function as, for example, an intermediary for allowing the API 145 or the application programs 147 to communicate with the kernel 141 to exchange data.

Furthermore, the middleware 143 may process one or more task requests, which are received from the application programs 147, according to priorities thereof. For example, the middleware 143 may assign priorities for using the system resources (e.g., the bus 110, the processor 120, the memory 130, etc.) of the electronic device 101 to one or more of the application programs 147. For example, the middleware 143 may perform scheduling or loading balancing on the one or more task requests by processing the one or more task requests according to the priorities assigned to the one or more applications.

The API 145, which is an interface through which the applications 147 control functions provided from the kernel 141 or the middleware 143, may include, for example, at least one interface or function (e.g., instruction) for file control, window control, image processing, text control, etc.

The input/output interface 150 may include various input/output circuitry that function as, for example, an interface that can forward instructions or data, which are input from a user or an external device, to the other element(s) of the electronic device 101. Furthermore, the input/output interface 150 may output the instructions or data received from the other element(s) of the electronic device 101 to the user or another external device.

Examples of the display 160 may include a Liquid Crystal Display (LCD), a Light-Emitting Diode (LED) display, an Organic Light-Emitting Diode (OLED) display, a MicroElectroMechanical Systems (MEMS) display, and an electronic paper display. The display 160 may display, for example, various types of contents (e.g., text, images, videos, icons, symbols, etc.) for a user. The display 160 may include a touch screen and may receive, for example, a touch, gesture, proximity, or hovering input using an electronic pen or the user's body part.

The communication interface 170 may include various communication circuitry arranged or configured to enable communication, for example, between the electronic device 101 and an external device (e.g., a first external electronic device 102, a second external electronic device 104, or a server 106). For example, the communication interface 170 may be connected to a network 162 through wireless or wired communication to communicate with the external device (e.g., the second external electronic device 104 or the server 106). The communication interface 170 may include a Communication Processor (CP), and the communication processor may constitute one of a plurality of modules that constitute the communication interface 170. In one embodiment, the communication processor may also be included in the processor 120.

The wireless communication may use at least one of, for example, Long Term Evolution (LTE), LTE-Advance (LTE-A), Code Division Multiple Access (CDMA), Wideband CDMA (WCDMA), Universal Mobile Telecommunications System (UNITS), WiBro (Wireless Broadband), Global System for Mobile Communications (GSM), etc., as a cellular communication protocol. In addition, the wireless communication may include, for example, short range communication 164. The short range communication 164 may include, for example, at least one of Wi-Fi, Bluetooth, Near Field Communication (NFC), Global Navigation Satellite System (GNSS), etc. The GNSS may include at least one of, for example, a Global Positioning System (GPS), a Global navigation satellite system (Glonass), a Beidou navigation satellite system (hereinafter, referred to as "Beidou"), and Galileo (European global satellite-based navigation system) according to the place of usage, a bandwidth, etc. Hereinafter, in the present disclosure, "GPS" may be interchangeably used with "GNSS". The wired communication may include, for example, at least one of a Universal Serial Bus (USB), a High Definition Multimedia Interface (HDMI), Recommended Standard 232 (RS-232), a Plain Old Telephone Service (POTS), etc. The network 162 may include at least one of a communication network such as a computer network (e.g., a LAN or a WAN), the Internet, and a telephone network.

Each of the first and second external electronic devices 102 and 104 may be of a type identical to or different from that of the electronic device 101. According to an embodiment, the server 106 may include a group of one or more servers. According to various embodiments of the present disclosure, all or some of operations performed by the electronic device 101 may be performed by another electronic device or multiple electronic devices (e.g., the first and second external electronic devices 102, 104 or the server 106). According to an embodiment, when the electronic device 101 has to perform some functions or services automatically or in response to a request, the electronic device 101 may request another device (e.g., the electronic device 102, 104 or the server 106) to perform at least some functions relating thereto instead of, or in addition to, performing the functions or services by itself. Another electronic device (e.g., the electronic device 102, 104, or the server 106) may execute the requested functions or the additional functions, and may deliver a result of the execution to the electronic device 101. The electronic device 101 may provide the received result as it is, or may additionally process the received result to provide the requested functions or services. To this end, for example, cloud computing, distributed computing, or client-server computing technology may be used.

Figure 2:
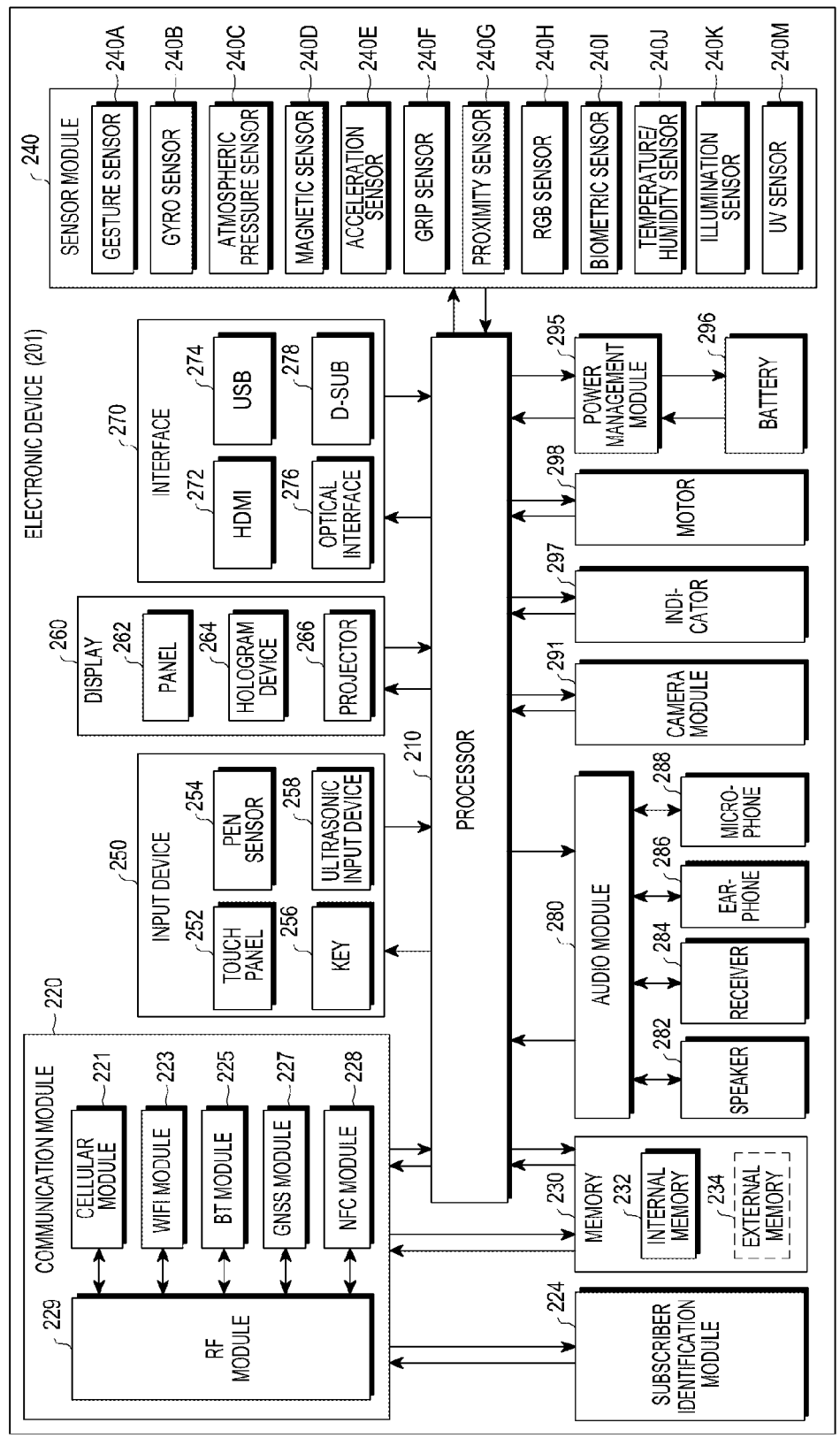
FIG. 2 is a block diagram illustrating an example electronic device according to various example embodiments of the present disclosure.

FIG. 2 is a block diagram illustrating an example electronic device 201 according to various example embodiments of the present disclosure. The electronic device 201 may include, for example, the whole or part of the electronic device 101 illustrated in FIG. 1. The electronic device 201 may include one or more processors (e.g., application processor (AP)) 210, a communication module (e.g., including communication circuitry) 220, a memory 230, a sensor module 240, an input device (e.g., including input circuitry) 250, and a display 260, and the electronic device 201 may further include at least one of a subscriber identification module 224, an interface (e.g., including interface circuitry) 270, an audio module 280, a camera module 291, a power management module 295, a battery 296, an indicator 297, and a motor 298.

The processor 210 may control a plurality of hardware or software elements connected thereto and may perform various data processing and operations by driving an operating system or an application program. The processor 210 may have, for example, an identical or similar configuration as the processor 120 of FIG. 1. The processor 210 may be embodied as, for example, a System on Chip (SoC). According to an embodiment, the processor 210 may further include a Graphic Processing Unit (GPU) and/or an image signal processor. The processor 210 may also include at least some (e.g., a cellular module 221) of the elements illustrated in FIG. 2. The processor 210 may load, into a volatile memory, instructions or data received from at least one (e.g., a non-volatile memory) of the other elements, process the loaded instructions or data, and may store various data in a non-volatile memory.

The communication module 220 may have a configuration that is the same as, or similar to, that of the communication interface 170 illustrated in FIG. 1. The communication module 220 may include various communication circuitry, such as, for example, and without limitation, a cellular module 221, a Wi-Fi module 223, a Bluetooth module 225, a GNSS module 227 (e.g., a GPS module, a Glonass module, a Beidou module, or a Galileo module), an NFC module 228, and a Radio Frequency (RF) module 229.

The cellular module 221 may include various communication circuitry that provide, for example, a voice call, a video call, a text message service, an Internet service, etc. through a communication network. According to an embodiment, the cellular module 221 may identify and authenticate the electronic device 201 within a communication network using a subscriber identification module (e.g., the SIM card 224). According to an embodiment, the cellular module 221 may perform at least some of the functions that the processor 210 may provide. According to an embodiment, the cellular module 221 may include a Communication Processor (CP).

The Wi-Fi module 223, the BT module 225, the GNSS module 227, or the NFC module 228 may include, for example, a processor for processing data that is transmitted and received through the corresponding module. According to some embodiments, at least some (e.g., two or more) of the cellular module 221, the Wi-Fi module 223, the BT module 225, the GNSS module 227, and the NFC module 228 may be included in one Integrated Chip (IC) or IC package.

The RF module 229, for example, may transmit/receive a communication signal (e.g., an RF signal). The RF module 229 may include, for example, a transceiver, a Power Amplifier Module (PAM), a frequency filter, a Low Noise Amplifier (LNA), an antenna, etc. According to another embodiment, at least one of the cellular module 221, the Wi-Fi module 223, the BT module 225, the GNSS module 227, and the NFC module 228 may transmit/receive an RF signal through a separate RF module.

The subscriber identification module 224 may include, for example, a card including a subscriber identity module and/or an embedded SIM, and may contain unique identification information (e.g., an Integrated Circuit Card Identifier (ICCID)) or subscriber information (e.g., an International Mobile Subscriber Identity (IMSI)).

The memory 230 (e.g., the memory 130) may include, for example, an internal memory 232 or an external memory 234. The internal memory 232 may include, for example, at least one of a volatile memory (e.g., a Dynamic Random Access Memory (DRAM), a Static RAM (SRAM), a Synchronous Dynamic RAM (SDRAM), etc.) and a non-volatile memory (e.g., a One Time Programmable Read Only Memory (OTPROM), a Programmable ROM (PROM), an Erasable and Programmable ROM (EPROM), an Electrically Erasable and Programmable ROM (EEPROM), a mask ROM, a flash ROM, a flash memory (e.g., a NAND flash memory, a NOR flash memory, etc.), a hard disc drive, a Solid State Drive (SSD), etc.).

The external memory 234 may further include a flash drive, for example, a Compact Flash (CF), a Secure Digital (SD), a Micro-Secure Digital (Micro-SD), a Mini-Secure Digital (Mini-SD), an extreme Digital (xD), a Multi-Media Card (MMC), a memory stick, or the like. The external memory 234 may be functionally and/or physically connected to the electronic device 201 through various interfaces.

The sensor module 240 may, for example, measure a physical quantity or detect the operating state of the electronic device 201 and may convert the measured or detected information into an electrical signal. The sensor module 240 may include, for example, at least one of a gesture sensor 240A, a gyro sensor 240B, an atmospheric pressure sensor 240C, a magnetic sensor 240D, an acceleration sensor 240E, a grip sensor 240F, a proximity sensor 240G a color sensor 240H (e.g., a red, green, blue (RGB) sensor), a biometric sensor 240I, a temperature/humidity sensor 240J, an illumination (e.g., light) sensor 240K, and a ultraviolet (UV) sensor 240M. Additionally or alternatively, the sensor module 240 may include, for example, an E-nose sensor, an electromyography (EMG) sensor, an electroencephalogram (EEG) sensor, an electrocardiogram (ECG) sensor, an Infrared (IR) sensor, an iris sensor, and/or a fingerprint sensor. The sensor module 240 may further include a control circuit for controlling one or more sensors included therein. In some embodiments, the electronic device 201 may further include a processor configured to control the sensor module 240 as a part of, or separately from, the processor 210, and may control the sensor module 240 while the processor 210 is in a sleep state.

The input device 250 may include various input circuitry, such as, for example, and without limitation, a touch panel 252, and the input device 250 may further include at least one of a (digital) pen sensor 254, a key 256, and an ultrasonic input device 258. The touch panel 252 may use, for example, at least one of a capacitive type, a resistive type, an infrared type, and an ultrasonic type. Furthermore, the touch panel 252 may further include a control circuit. The touch panel 252 may further include a tactile layer to provide a tactile reaction to a user.

The (digital) pen sensor 254 may include, for example, a recognition sheet which is a part of the touch panel or is separated from the touch panel. The key 256 may include, for example, a physical button, an optical key, or a keypad. The ultrasonic input device 258 may detect ultrasonic waves, which are generated by an input tool, through a microphone (e.g., a microphone 288) and may identify data corresponding to the detected ultrasonic waves.

The display 260 (e.g., display 160) may include a panel 262, and the display 260 may further include a hologram device 264, and/or a projector 266. The display 260 may include an identical or similar configuration as the display 160 of FIG. 1. The panel 262 may be implemented to be, for example, flexible, transparent, or wearable. The panel 262, together with the touch panel 252, may be implemented as one module. The hologram device 264 may show a three-dimensional image in the air using an interference of light. The projector 266 may display an image by projecting light onto a screen. The screen may be located, for example, in the interior of, or on the exterior of, the electronic device 201. According to one embodiment, the display 260 may further include a control circuit for controlling the panel 262, the hologram device 264, or the projector 266.

The interface 270 may include various interface circuitry, such as, for example, and without limitation, at least one of a High-Definition Multimedia Interface (HDMI) 272, a Universal Serial Bus (USB) 274, an optical interface 276, and a D-subminiature (D-sub) 278. The interface 270 may be included in, for example, the communication circuit 170 illustrated in FIG. 1. Additionally or alternatively, the interface 270 may include, for example, a Mobile High-definition Link (MHL) interface, a Secure Digital (SD) card/Multi-Media Card (MMC) interface, or an Infrared Data Association (IrDA) standard interface.

The audio module 280 may, for example, convert a sound into an electrical signal, and vice versa. At least some elements of the audio module 280 may be included, for example, in the input/output interface 150 illustrated in FIG. 1. The audio module 280 may process sound information that is input or output through, for example, a speaker 282, a receiver 284, earphones 286, the microphone 288, etc.

The camera module 291 is a device that can photograph a still image and a dynamic image. According to an embodiment, the camera module 291 may include one or more image sensors (e.g., a front sensor or a rear sensor), a lens, an Image Signal Processor (ISP), or a flash (e.g., an LED, a xenon lamp, etc.).

The power management module 295 may manage, for example, the power of the electronic device 201. According to an embodiment, the power management module 295 may include a Power Management Integrated Circuit (PMIC), a charger Integrated Circuit (IC), or a battery or fuel gauge. The PMIC may use a wired and/or wireless charging method. Examples of the wireless charging method may include, for example, a magnetic resonance method, a magnetic induction method, an electromagnetic wave method, etc. Additional circuits (e.g., a coil loop, a resonance circuit, a rectifier, etc.) for wireless charging may be further included. The battery gauge may measure, for example, a residual quantity of the battery 296, and a voltage, a current, or a temperature while charging. The battery 296 may include, for example, a rechargeable battery and/or a solar battery.

The indicator 297 may display a particular state, for example, a booting state, a message state, a charging state, or the like of the electronic device 201 or a part (e.g., the processor 210) of the electronic device 201. The motor 298 may convert an electrical signal into a mechanical vibration and may generate a vibration, a haptic effect, etc. Although not illustrated, the electronic device 201 may include a processing unit (e.g., a GPU) for supporting mobile TV. The processing unit for supporting mobile TV may process media data according to a standard, for example, Digital Multimedia Broadcasting (DMB), Digital Video Broadcasting (DVB), mediaFLO™, etc.

Each of the above-described component elements of hardware (e.g., circuitry) according to the present disclosure may be configured with one or more components, and the names of the corresponding component elements may vary based on the type of electronic device. The electronic device according to various embodiments of the present disclosure may include at least one of the aforementioned elements. Some elements may be omitted or other additional elements may be further included in the electronic device. Also, some of the hardware components according to various embodiments may be combined into one entity, which may perform functions identical to those of the relevant components before the combination.

Figure 3:
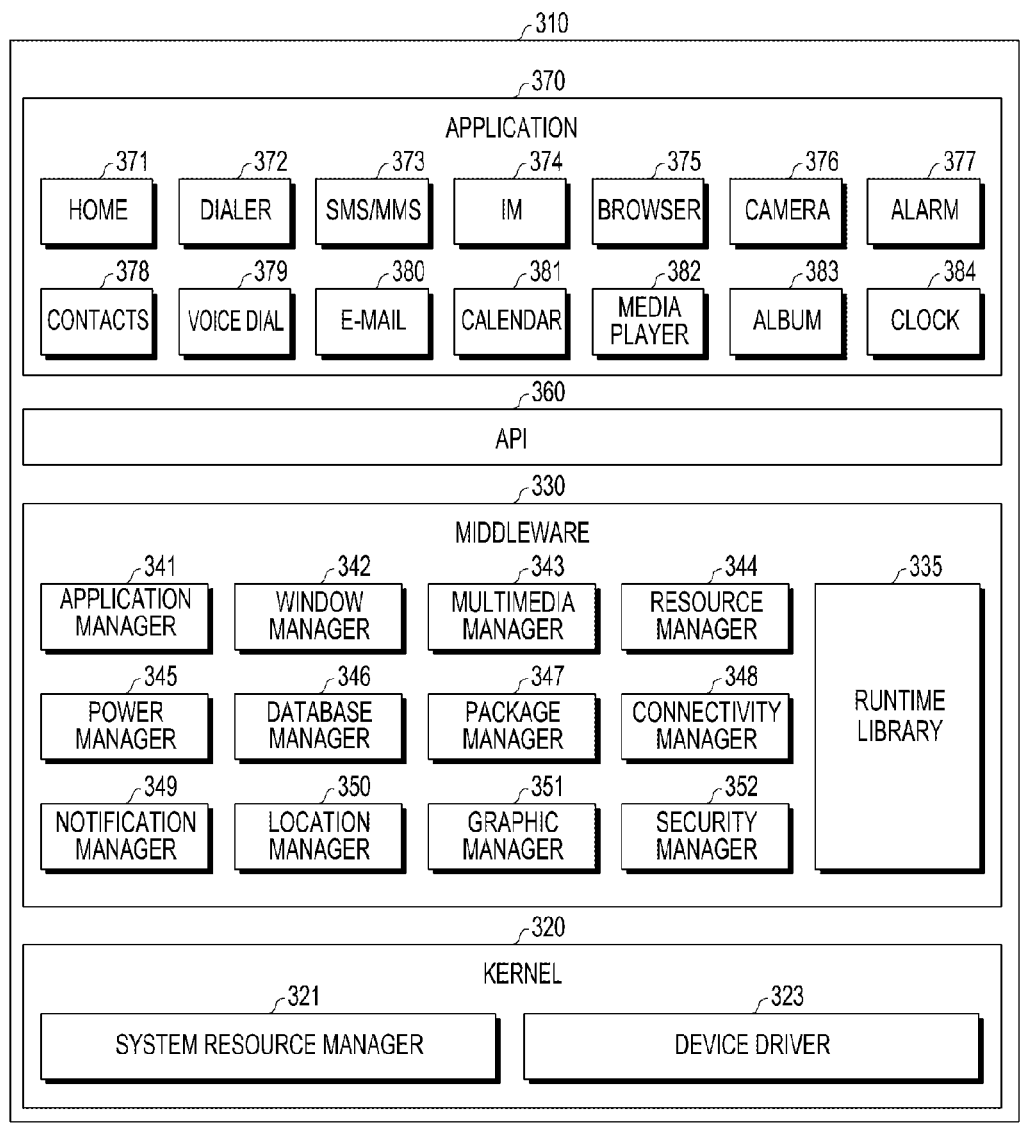
FIG. 3 is a block diagram illustrating an example program module according to various example embodiments of the present disclosure.

FIG. 3 is a block diagram illustrating an example program module according to various example embodiments of the present disclosure. According to an example embodiment, the program module 310 (e.g., the program 140) may include an Operating System (OS) that controls resources relating to an electronic device (e.g., the electronic device 101) and/or various applications (e.g., the application programs 147) that are executed in the operating system. The operating system may be, for example, Android, iOS, Windows, Symbian, Tizen, Bada, etc.

The program module 310 may include a kernel 320, middleware 330, an Application Programming Interface (API) 360, and/or applications 370. At least a part of the program module 310 may be preloaded on the electronic device, or may be downloaded from an external electronic device (e.g., the electronic device 102, 104 or the server 106).

The kernel 320 (e.g., the kernel 141) may include, for example, a system resource manager 321 and/or a device driver 323. The system resource manager 321 may control, assign, or retrieve system resources. According to an embodiment, the system resource manager 321 may include a process management unit, a memory management unit, a file system management unit, etc. The device driver 323 may include, for example, a display driver, a camera driver, a Bluetooth driver, a shared memory driver, a USB driver, a keypad driver, a Wi-Fi driver, an audio driver, or an Inter-Process Communication (IPC) driver.

The middleware 330, for example, may provide a function required by the applications 370 in common, or may provide various functions to the applications 370 through the API 360 so that the applications 370 can efficiently use the limited system resources of the electronic device. According to an embodiment, the middleware 330 (e.g., the middleware 143) may include, for example, at least one of a runtime library 335, an application manager 341, a window manager 342, a multimedia manager 343, a resource manager 344, a power manager 345, a database manager 346, a package manager 347, a connectivity manager 348, an notification manager 349, a location manager 350, a graphic manager 351, and a security manager 352.

The runtime library 335 may include, for example, a library module that a compiler uses in order to add a new function through a programming language while the applications 370 are being executed. The runtime library 335 may perform functions that are related to the management of input and output, the management of a memory, an arithmetic function, etc.

The application manager 341 may manage, for example, a life cycle of at least one of the applications 370. The window manager 342 may manage Graphical User Interface (GUI) resources used on a screen. The multimedia manager 343 may identify formats required for reproducing various media files and may encode or decode a media file using a codec suitable for the corresponding format. The resource manager 344 may manage resources of at least one of the applications 370, such as a source code, a memory, a storage space, etc.

The power manager 345 may operate together with, for example, a Basic Input/Output System (BIOS) to manage a battery or power and provide power information required for the operation of the electronic device. The database manager 346 may generate, search, or change a database to be used by at least one of the applications 370. The package manager 347 may manage the installation or the updating of an application that is distributed in the form of a package file.

The connectivity manager 348 may manage a wireless connection, for example, Wi-Fi, Bluetooth, etc. The notification manager 349 may display or notify of an event, such as an arrival message, an appointment, notification of proximity, etc., in such a manner as not to disturb a user. The location manager 350 may manage location information of the electronic device. The graphic manager 351 may manage a graphic effect to be provided to a user and a user interface relating to the graphic effect. The security manager 352 may provide all security functions required for system security or user authentication. According to an embodiment, in a case where the electronic device (e.g., the electronic device 101) has a telephone call function, the middleware 330 may further include a telephony manager for managing a voice or video call function of the electronic device.

The middleware 330 may include a middleware module that forms combinations of the various functions of the above-described elements. The middleware 330 may provide specialized modules according to the types of operating systems in order to provide differentiated functions. Furthermore, the middleware 330 may dynamically remove some of the existing elements, or may add new elements.

The API 360 (e.g., the API 145) is, for example, a set of API programming functions, and may be provided with different configurations according to operating systems. For example, in the case of Android or iOS, one API set may be provided for each platform, and in the case of Tizen, two or more API sets may be provided for each platform.

The applications 370 (e.g., the application programs 147) may include one or more applications that can perform functions, for example, home 371, dialer 372, SMS/MMS 373, Instant Message (IM) 374, browser 375, camera 376, alarm 377, contacts 378, voice dial 379, e-mail 380, calendar 381, media player 382, album 383, clock 384, health care (e.g., measuring exercise quantity or blood sugar), and environment information (e.g., atmospheric pressure, humidity, temperature information, etc.).

According to an embodiment, the applications 370 may include an application (hereinafter, referred to as an "information exchange application" for convenience of description) that supports information exchange between the electronic device (e.g., the electronic device 101) and an external electronic device (e.g., the electronic device 102, 104). The information exchange application may include, for example, a notification relay application for forwarding particular information to an external electronic device or a device management application for managing an external electronic device.

For example, the notification relay application may include a function of delivering, to the external electronic device (e.g., the electronic device 102, 104), notification information generated by other applications (e.g., an SMS/MMS application, an email application, a health care application, an environmental information application, and the like) of the electronic device 101. Furthermore, the notification relay application, for example, may receive notification information from an external electronic device and may provide the received notification information to a user.

The device management application may manage (e.g., install, delete, or update), for example, at least one function of an external electronic device (e.g., the electronic device 102, 104) that communicates with the electronic device (e.g., a function of turning on/off the external electronic device itself (or some components thereof) or a function of adjusting the brightness (or resolution) of a display), applications that operate in the external electronic device, or services (e.g., a call service, a message service, etc.) that are provided by the external electronic device.

According to an embodiment, the applications 370 may include attributes of applications (e.g., a health care application of a mobile medical appliance or the like) designated according to attributes of the external electronic device (e.g., the electronic device 102, 104). According to an embodiment, the applications 370 may include applications that are received from an external electronic device (e.g., the server 106, or the electronic device 102, 104). According to an embodiment, the applications 370 may include a preloaded application or a third party application that may be downloaded from a server. Names of the elements of the program module 310, according to the above-described embodiments of the present disclosure, may change depending on the type of OS.

According to various embodiments of the present disclosure, at least some of the program module 310 may be implemented in software, firmware, hardware, or a combination of two or more thereof. At least some of the program module 310 may be implemented (e.g., executed) by, for example, the processor (e.g., the processor 210). At least a part of the program module 310 may include, for example, a module, a program, a routine, a set of instructions, a process, etc. for performing one or more functions.

Figure 4:
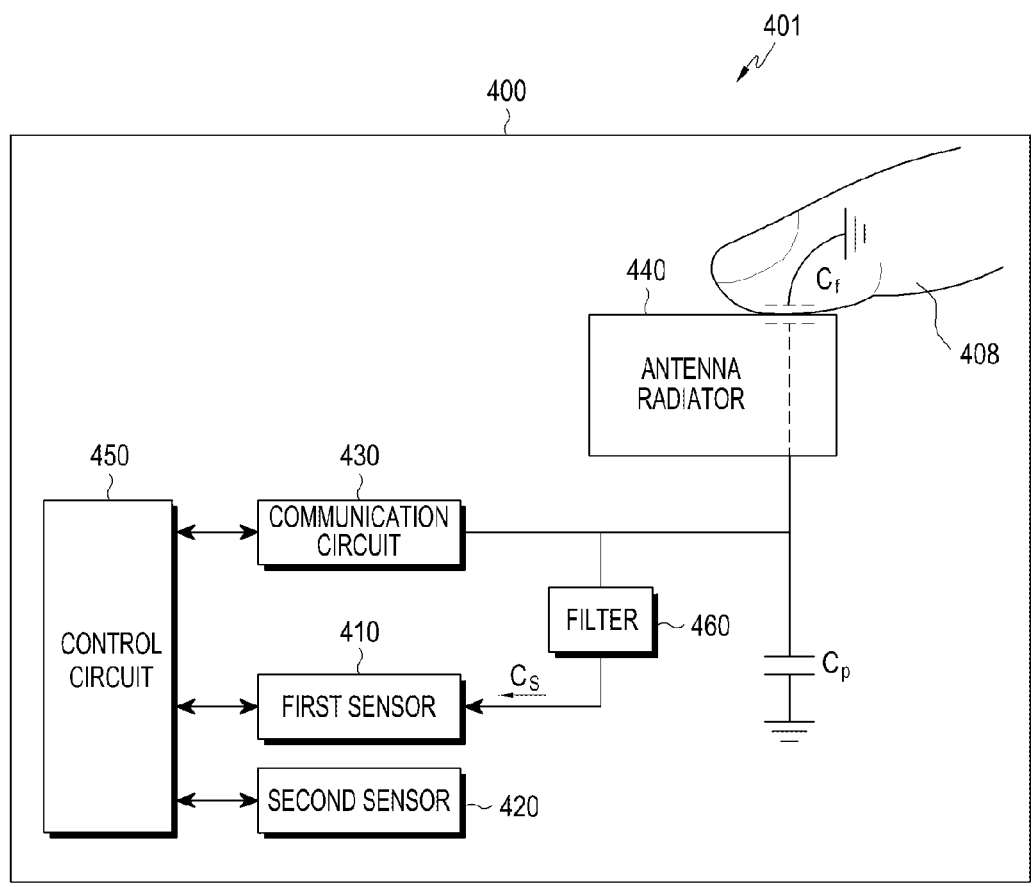
FIG. 4 is a block diagram illustrating an example electronic device according to various embodiments of the present disclosure.

FIG. 4 is a block diagram illustrating an example electronic device according to various example embodiments of the present disclosure. Referring to FIG. 4, the electronic device 401 may include a housing 400, a first sensor 410, a second sensor 420, a communication circuit 430, an antenna radiator 440, and a control circuit 450. The electronic device 401 may include the whole or part of the electronic device 101, 201 illustrated in FIGS. 1 and 2.

The housing 400 may include a first surface (e.g., the front surface (FF: front face), a second surface (e.g., the rear surface (BF: back face)) facing a direction that is opposite to the first surface, and side surfaces (SF: side face) that surround at least a part of a space between the first surface and the second surface. The first sensor 410, the second sensor 420, the communication circuit 430, the antenna radiator 440, and the control circuit 450 may be disposed, for example, inside the housing 400. Here, the first and second sensors 410, 420 may be disposed to be exposed through at least one surface (e.g., at least one of the front surface FF, the rear surface BF, and the side surface SF.

The antenna radiator 440 may be an antenna having a conductive pattern disposed on the inner surface or inside the housing 400. The antenna radiator 440 may resonate in a first frequency band determined in advance, and may be a radiator having a power supply unit (not shown) and a ground unit (not shown). The antenna radiator 440 may have two ends electrically connected with the communication circuit 430.

According to an embodiment, the antenna radiator 440 may be one of a mobile communication antenna, a sub-communication antenna, an NFC antenna, a broadcasting communication antenna, a GPS antenna, and an antenna for wireless charging.

According to an embodiment, when the antenna radiator 440 is a mobile communication antenna (or a main antenna), the antenna radiator 440 may be one of various mobile communication antennas including a cellular communication antenna, an LTE communication antenna, a 3G communication antenna, a WiBro antenna, a WIMAX antenna, etc., and may resonate in a mobile communication frequency band. The mobile communication frequency band may be one of a 3G communication frequency band, an LTE frequency band, a WiBro frequency band, and a WIMAX frequency band, and may be any one of a 800 MHz band, a 900 MHz band, a 1.8 GHz band, a 2.1 GHz band, a 2.3 GHz band, and a band from 2 GHz to 11 GHz.

According to an embodiment, when the antenna radiator 440 is a sub-communication antenna, the antenna radiator 440 may be a Wi-Fi antenna for wireless LAN communication and a Bluetooth antenna for short range wireless communication, and may resonate on a sub-communication frequency band. The sub-communication frequency band may be a 2.4 GHz band for the Wi-Fi antenna, and may be a 2.45 GHz band for the Bluetooth antenna. The Wi-Fi antenna and the Bluetooth antenna may be commonly used.

According to an embodiment, the antenna radiator 440 may be an NFC antenna and may resonate in an NFC frequency band. The NFC frequency band may be a 56 MHz band.

According to an embodiment, when the antenna radiator 440 is a broadcasting communication antenna, the antenna radiator 440 may be a satellite DMB antenna or a terrestrial DMB antenna and may resonate in a satellite DMB antenna band or a terrestrial DMB antenna band. The satellite DMB band may be a 2.5 GHz band, and the terrestrial DMB band may be a band from 180 MHz to 210 MHz.

The described embodiments of the present disclosure took an example of the antenna radiator 440 to be one of the mobile communication antenna, the sub-communication antenna, the NFC antenna, the broadcasting communication antenna, the GPS antenna, and the antenna for wireless charging, but are not limited thereto. Further, the antenna radiator 440 may be an antenna having a conductive pattern, and other antennas using a first frequency (e.g., hundreds of MHz or several GHz) band may also be possible.

The communication circuit 430 may include various communication circuitry and may be disposed inside the housing 400, and perform communication by transmitting or receiving a first signal (e.g., a communication signal) of the first frequency band to or from an external device (e.g., external electronic device 102, 104) using the antenna radiator 440. The communication circuit 430 may include the communication interface 170 of FIG. 1 or the entire or some of the communication module 220 illustrated in FIG. 2. The communication circuit 430 may be referred to as a communication unit or a communication module, include the communication unit or the communication module as a part thereof, or constitute the communication unit or the communication module.

According to an embodiment, when the antenna radiator 440 is a mobile communication antenna, the communication circuit 430 may transmit or receive the first signal to or from the external device (e.g., external device 102, 104) through one of various mobile communications including cellular communication, LTE communication, 3G communication, WiBro communication, WIMAX communication, etc.

The antenna radiator 440 and the communication circuit 430 may be electrically connected, and an alternating current of hundreds mA or several A may flow between the antenna radiator 440 and the communication circuit 430 when there is resonation (when communication is performed) at the first frequency (e.g., hundreds of MHz or several GHz) or in a standby mode (when communication is not performed).

In a case where a contact with a human body occurs when the antenna radiator 440 resonates at the first frequency (e.g., hundreds of MHz or several GHz) or in the stand-by mode, current of several mA corresponding to a second frequency (e.g., hundreds of KHz) which is a predetermined band lower than the first frequency may occur by the contact.

The first sensor 410 may be disposed inside the housing 400 or exposed through at least one of surfaces (e.g., at least one of the front surface FF, the rear surface BF, and the side surface SF). In FIG. 4, reference signs Cs, Cf, and Cp do not indicate actual capacitors, but are displayed for virtual capacitance in order to describe an operational principle of the first sensor 410. The first sensor 410 may be electrically connected with a conductive pad (not shown), and may be connected with a ground (GND) of a Printed Circuit Board (PCB). When the antenna radiator 440 is in contact with the external object 408 (e.g., a human body or an object except for a human body), a change may occur, by the contact, between a capacitance element Cs before the contact and a capacitance element Cs' (not shown) after the contact.

For example, the capacitance element Cs before the contact is a capacitance element Cp between the first sensor 410 (e.g., a grip sensor) and the PCB ground, whereas the capacitance element Cs' after the contact is a value increased as much as the amount of a capacitance element Cf between a contact point and the conductive pad (not shown) from the capacitance element Cp between the first sensor 410 and the PCB ground. The first sensor 410 may sense the amount of change between the capacitance element Cs before the contact to the conductive pad (not shown) and the capacitance element Cs' after the contact to the conductive pad (not shown), and detect whether or not the external object 408 is in contact therewith to generate a second signal (e.g., a grip sensing signal), so as to perform (grip) sensing.

Such a conductive pad (not shown) for (grip) sensing in the first sensor 410 may be deposited on an apparatus of the electronic device 401 or mounted in a Flexible Printed Circuit Board (FPCB) form on the electronic device 401.

Meanwhile, when the conductive pad (not shown) for (grip) sensing in the first sensor 410 is deposited on the apparatus of the electronic device 401 or mounted in the Flexible Printed Circuit Board (FPCB) form on the electronic device 401, since the conductive pad is additionally mounted on the electronic device 401, a space for the conductive pad needs to be prepared inside the electronic device 401 and the price of the electronic device 401 may be increased by adding the price of the conductive pad. Further, since the conductive pad for (grip) sensing is conductive, the conductive pad needs to be disposed to be spaced apart from other parts (e.g., circuits such as the antenna radiator 440 having a conductive pattern, parts, or elements) which may be influenced by conductivity of the conductive pad, and therefore, a difficulty in securing space therefor or mounting the conductive pad on the electronic device 401 may be caused.

Therefore, in the various embodiments of the present disclosure, circuits or parts having conductive materials among modules or parts according to the electronic device 401 are utilized as an element of the first sensor 410, that is, the conductive pad. According to an embodiment, the antenna radiator 440 may be used as a conductive pad for the first sensor 410.

According to an embodiment, the first sensor 410, for example, may include at least one of a grip sensor, a proximity sensor, and a motion sensor. It should be understood by a person skilled in the art that the first sensor 410 is not limited to the description above, and all sensors that can sense the external object 408 that approaches the electronic device 401 are available. For example, the first sensor 410 may supply, to the antenna radiator 440, a second frequency signal (a signal of hundreds of KHz) that has a lower frequency than the first frequency when the first sensor 410 is a grip sensor, and may detect a several mA change in a current generated from the antenna radiator 440 to output the second signal (e.g., a grip sensing signal) when the external object 408 approaches the antenna radiator 440. That is, the external object 408 approaching or contacting the electronic device 401 may be detected through the output of the second signal (e.g., a grip sensing signal) from the first sensor 410.

Here, the electronic device 401 may further include the filter 460 (e.g., a low pass filter, LPF) through which a low frequency band passes, between an end of the antenna radiator 440 and the first sensor 410.

The filter 460, between the antenna radiator 440 and the first sensor 410, enables only several mA of current by the second frequency (e.g., hundreds of KHz) lower than the first frequency among all frequency bands of the antenna radiator 440 to be transmitted to the first sensor 410. Since the current by the second frequency (e.g., hundreds of KHz) is similar to a direct current and does not influence communication, the antenna radiator 440 may thus be able to function as a radiator for communication and perform a role of the conductive pad for (grip) sensing the first sensor 410 at the same time.

The second sensor 420 may be disposed inside the housing 400, or exposed through at least one surface (e.g., at least one of the front surface FF, the rear surface BF, and the side surface SF). When the external object 408 approaches or is in contact with the electronic device 401, the second sensor 420 may detect an orientation (e.g., one of the front surface FF, rear surface BF, and side surfaces SF of the electronic device 401) of the electronic device 410, in which approaching or contacting occurs so as to output a third signal. The third signal output from the second sensor 420 may include information on a direction in which the external object 408 approaches or is in contact with the electronic device 401. The information on a direction may include at least one of the front surface FF, the rear surface BF, and the side surface SF.

According to an embodiment, the second sensor 420 may include at least one of an acceleration sensor, a gyro sensor, and a geomagnetic sensor. It should be understood by a person skilled in the art that the second sensor 420 is not limited to the above description, and all sensors capable of sensing an orientation in which the external object 408 approaches or is in contact with the electronic device 401 are available.

The control circuit 450 may generally control the electronic device 401 according to various embodiments. The control circuit 450 may include the whole or part of the processor 120 illustrated in FIG. 1 or processor 210 illustrated in FIG. 2. The control circuit 450 may be referred to as a controller or a control module, include the controller or the control module as a part thereof, or constitute the controller or the control module.

The control circuit 450 may be electrically and individually connected with at least one of the first sensor 410 and the second sensor 420, and the communication circuit 430. The control circuit 450 may transmit or receive the first signal from the communication circuit 430 to or from the external device (e.g., the external device 102, 104), using the antenna radiator 440. The control circuit 450 may detect, using the first sensor 410, whether or not the external object 408 has approached at least a part of the antenna radiator 440, so as to generate the second signal. When the external object 408 has approached at least a part of the antenna radiator 440, the control circuit 450 may detect, using the second sensor 420, an orientation of the electronic device 401 toward which the external object 408 approaches, so as to generate the third signal. The control circuit 450 may decrease the strength of the first signal based on some of the generated second signal or third signal. For example, the control circuit 450 determines whether or not the external object 408 approaches at least a part of the antenna radiator 440, based on the generated second signal. When it is determined that the external object 408 has approached at least a part of the antenna radiator 440, the control circuit 450 may detect a direction in which the external object 408 has approached the antenna radiator 440, for example, the orientation of the electronic device, based on the third signal.

According to an embodiment, the control circuit 450 may adjust a threshold value of the second signal output value (e.g., the amount of change in capacitance between the antenna radiator 440 and the external object 408) with respect to the front surface FF direction of the electronic device and a direction except for the front surface FF (i.e., one of the rear surface BF direction and the side surface SF direction) to be different according to the detected orientation of the electronic device, so as to control the strength of the first signal (e.g., output power of the antenna radiator 440) to be decreased or maintained.

According to an embodiment, the control circuit 450 may adjust the second signal output value (e.g., the amount of change in capacitance between the antenna radiator 440 and the external object 408) with respect to the front surface FF direction of the electronic device and a direction except for the front surface FF (i.e., one of the rear surface BF direction and the side surface SF direction) to be different, so as to control the strength of the first signal (e.g., output power of the antenna radiator 440) to be decreased or maintained.

According to an embodiment, the control circuit 450 may perform a control to determine a distance between the antenna radiator 440 of the electronic device 401 and the external object 408 based on the second signal, differentially configure a predetermined threshold value for the second signal output value according to the determined distance, and differentially decrease the strength of the first signal according to the determined distance. A detailed description of such operation of the control circuit 450 may be described later in more detail, with reference to FIGS. 6 to 9.

Figure 5A:
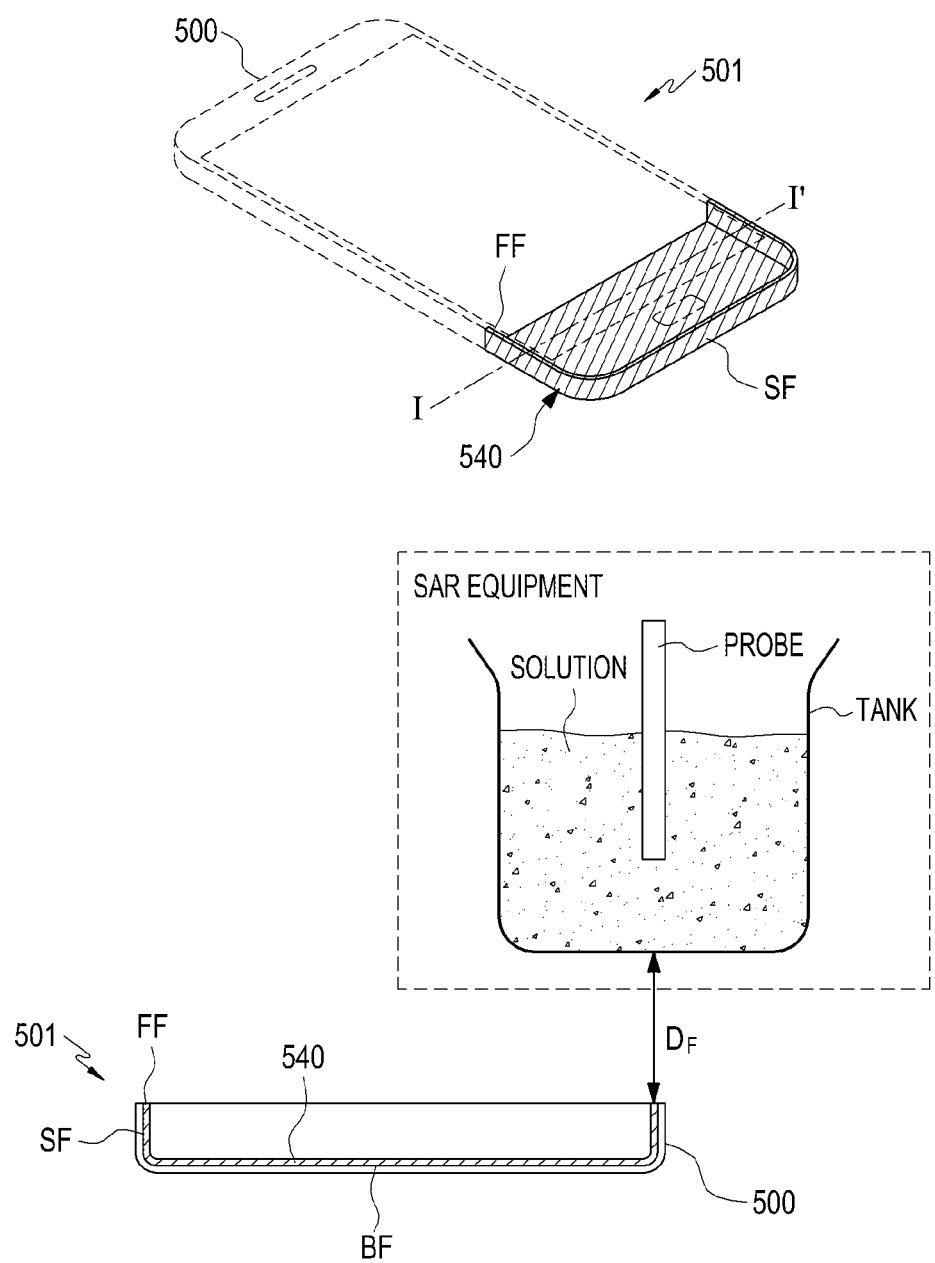
FIGS. 5A, 5B and 5C are diagrams illustrating an example SAR measurement method according to an orientation of an electronic device according to various example embodiments.
Figure 5B:
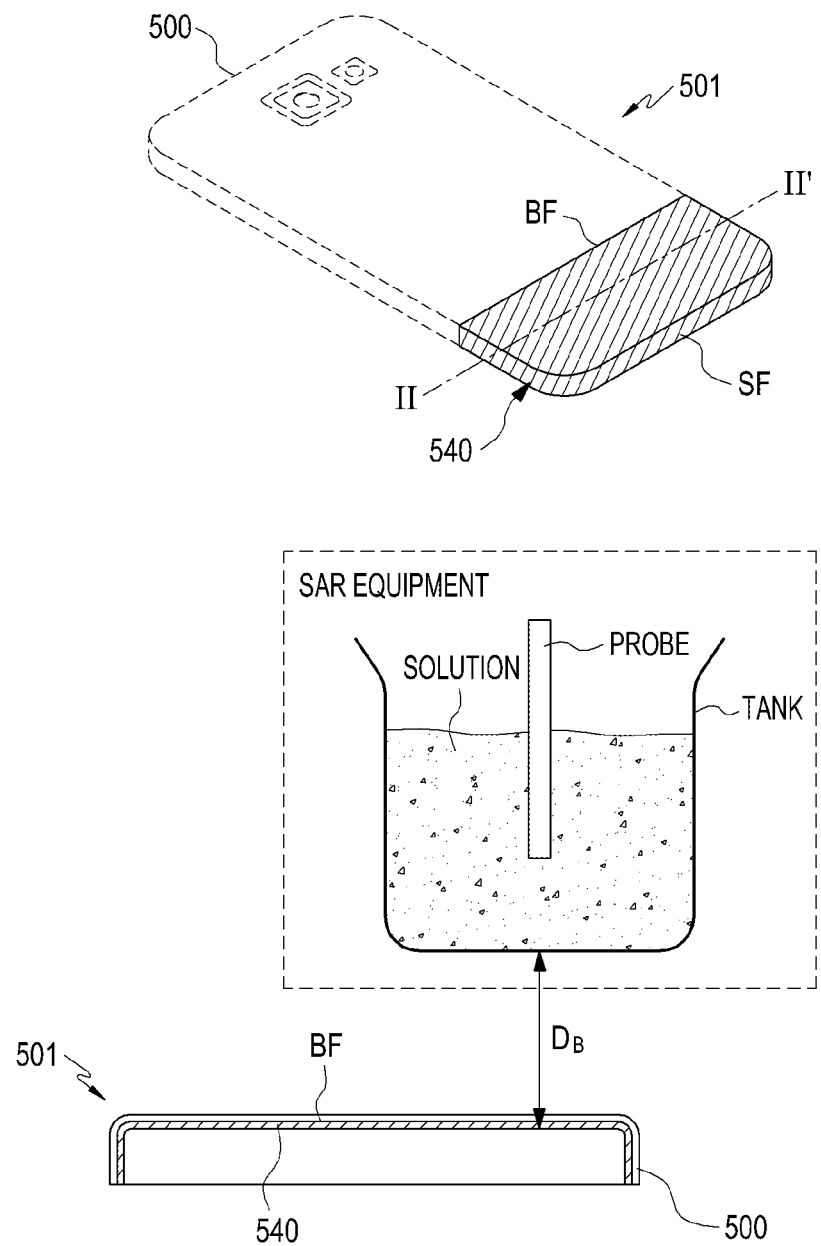
Figure 5C:
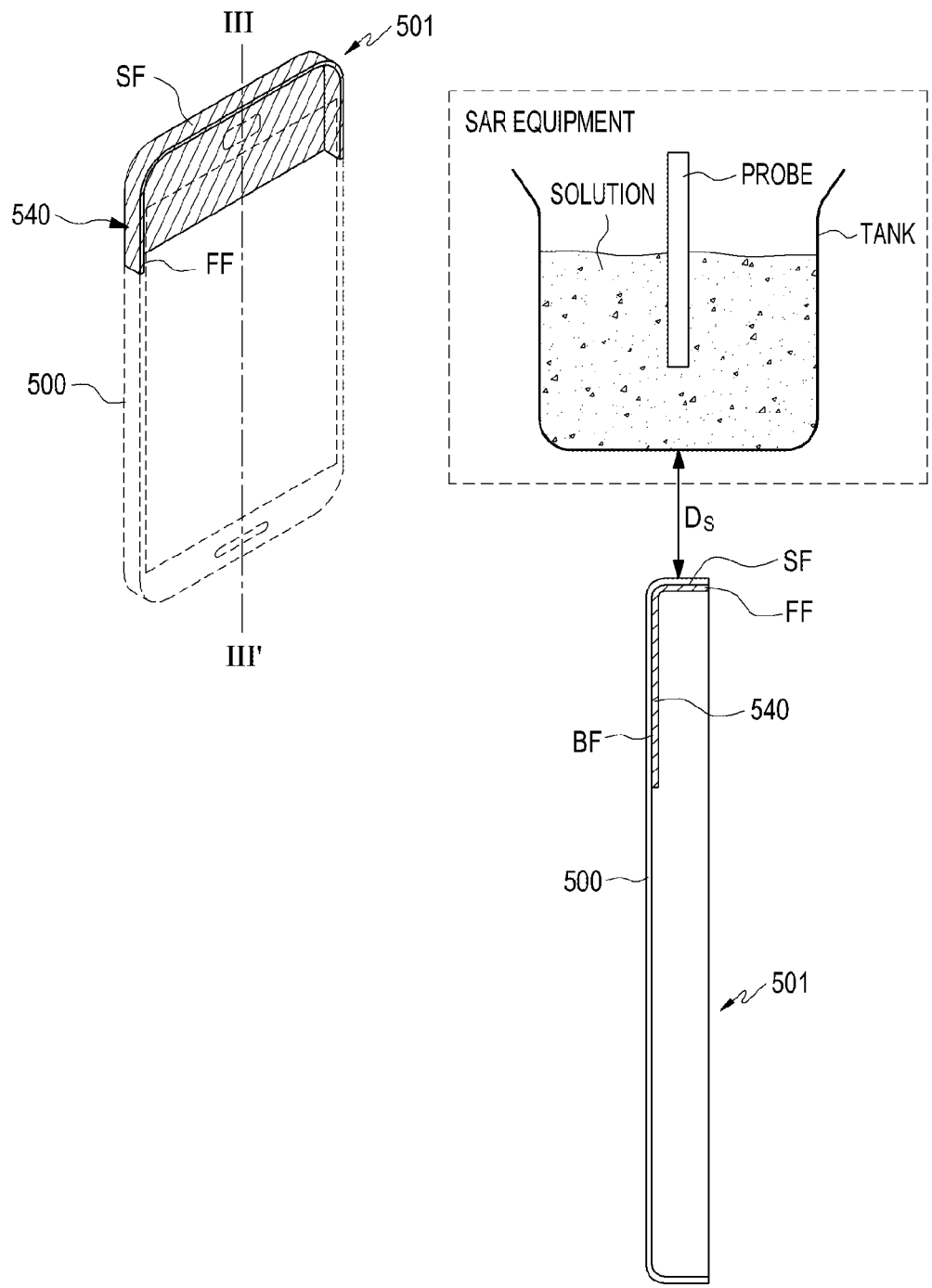

FIGS. 5A, 5B and 5C are diagrams illustrating an example SAR measurement method according to an orientation of an electronic device according to various example embodiments. The electronic device 501 may include the whole or part of the electronic device 401 of FIG. 4.

Referring to FIGS. 5A to 5C, the electronic device 501 may detect, using specific absorption rate (SAR) measurement equipment (e.g., Daisy SAR equipment), an orientation of the electronic device 501 toward which a human body approaches when the human body approaches the electronic device 501. Here, the SAR measurement equipment that is equipment for measuring an SAR instead of a human body may create an environment which is similar or identical to the human body, so as to measure an SAR. For example, the SAR equipment may include a predetermined solution contained in a tank, and a probe contained in the solution. The solution may have an identical dielectric constant as that of a human body in a particular frequency. Accordingly, hereinafter, the SAR equipment and a human body may be interchangeably used.

Meanwhile, the probe may measure an SAR in a particular frequency from the solution. For example, the probe may be electrically connected with the first sensor 410 of FIG. 4, and may transmit an SAR value measured through the probe to the first sensor 410 of FIG. 4. The SAR value measured through the first sensor 410 of FIG. 4 may be different according to the orientation of the electronic device 401. An antenna radiator 540, as illustrated in FIGS. 5A to 5C, may be disposed inside a housing 500 or disposed on at least one of surfaces (e.g., at least one of the front surface FF, the rear surface BF, and the side surface SF) of the housing 500.

For example, as illustrated in FIG. 5A, referring to a cross-sectional view in direction IT of the electronic device 501, SAR equipment (e.g., a human body) is located on the front surface (FF: front face) of the electronic device 501 so as to measure an SAR of a case where the human body approaches in the front surface FF direction of the electronic device 501, through the first sensor 410. Here, an SAR measurement value (i.e., the amount of change in capacitance Cs) may be measured according to a distance DF between the front surface FF of the antenna radiator 540 of the electronic device 501 and the front surface of the SAR equipment.

As illustrated in FIG. 5B, referring to a cross-sectional view in direction II-IF of the electronic device 501, SAR equipment (e.g., a human body) is located in on the rear surface (BF: back face) of the electronic device 501 so as to measure an SAR of a case where the human body approaches in the rear surface BF direction of the electronic device 501, through the first sensor 410. Here, an SAR measurement value (i.e., the amount of change in capacitance Cs) may be measured according to a distance DB between the rear surface BF of the antenna radiator 540 of the electronic device 501 and the rear surface of the SAR equipment.

As illustrated in FIG. 5C, referring to a cross-sectional view in direction III-III' of the electronic device 501, SAR equipment (e.g., a human body) is located in on the side surface (SF: side face) (e.g., bottom surface) of the electronic device 501 so as to measure an SAR of a case where the human body approaches in the side surface SF direction of the electronic device 501, through the first sensor 410. Here, an SAR measurement value (i.e., the amount of change in capacitance Cs) may be measured according to a distance DS between the side surface SF of the antenna radiator 540 of the electronic device 501 and the side surface of the SAR equipment. In FIG. 5C, the side surface SF is illustrated as the bottom surface but not limited thereto, and the side surface SF may include at least one of the top surface, the left side surface, and the right side surface.

As illustrated in FIGS. 5A to 5C, SAR values measured on each surface of the electronic device 501 may be different from each other. For example, an SAR measurement value in a case where a human body approaches in the front surface FF direction of the electronic device 501 may be relatively smaller than an SAR measurement value of a case where the human body approaches in a direction except for the front surface FF direction (i.e., one of the rear surface BF direction and the side surface SF direction).

An example of an SAR measurement value according to an orientation of the electronic device, i.e., the amount of change (e.g., a second signal output value) in capacitance between the external object (e.g., a human body or an object except for a human body) and the antenna radiator 540, a threshold value (e.g., first threshold value) predetermined according to an orientation (e.g., a third signal) of the electronic device with respect to the SAR measurement value, an up-regulated threshold value (e.g., second threshold value), whether or not an output power back off operation for decreasing output power from the antenna radiator 440 according to the orientation of the electronic device is performed, etc., are summarized in [TABLE 1] below.

TABLE 1

| Touch surface | | Amount of change in capacitance (delta) | Threshold (up-regulated threshold) | Whether or not PWR back off operates |
|---|---|---|---|---|
| Daisy SAR equipment (human body) | Front | 8000 | 6000 | Operating |
| | Side | 28000 | 6000 (e.g., 6000*3 = 18000) | Operating |
| | Back (rear) | 22000 | 6000 (e.g., 6000*3 = 18000) | Operating |
| Desk | Front | 3000 | 6000 | Not operating |
| | Side | 9400 | 6000 (e.g., 6000*3 = 18000) | Not operating |
| | Back (rear) | 7000 | 6000 (e.g., 6000*3 = 18000) | Not operating |

Referring to [TABLE 1], the amount of change in capacitance between an external object (e.g., a human body or an object except for a human body (e.g., a desk)) and the antenna radiator 540 may be measured to have different values according to a direction in which the external object approaches the electronic device. When the detected orientation of the electronic device is the front surface FF direction, it can be perceived that the amount of change in the capacitance is relatively smaller than that of a direction except for the front surface FF, that is, the side surface SF direction and the rear surface BF direction.

According to an embodiment, the predetermined threshold value (Th) (e.g., first threshold value) may be configured to be equal to or smaller than the amount of change in capacitance (e.g., 8000) in a case where the approach of a human body has been detected in the front surface FF direction of the electronic device, and configured to be equal to or greater than the amount of change in capacitance (e.g., 3000) in a case where the approach of an object except for a human body (e.g., a desk) has been detected in the front surface FF of the electronic device. For example, the predetermined threshold value (Th) (e.g., first threshold value) may be configured to be "6000" as shown in [TABLE 1]. When the predetermined threshold value (Th) (e.g., first threshold value) is configured to be "6000", the electronic device may compare the amount of change in capacitance due to the external object that approaches in the front surface FF direction with the predetermined threshold value (Th) (e.g., first threshold value), so as to determine whether the external object is a human body or not. For example, the electronic device may determine that the external object is a human body when the amount of change in capacitance due to the external object that approaches in the front surface FF direction is greater than the predetermined threshold value (Th) (e.g., first threshold value), and determine that the external object is an object (e.g., a desk) except for a human body, that is, not a human body when the amount of change in the capacitance is equal to or smaller than the predetermined threshold value (Th) (e.g., first threshold value). The predetermined threshold value (Th) (e.g., first threshold value (Th=6000)) may be able to distinguish a human body from an object except for a human body, but may not be able to distinguish an orientation of the electronic device, in which the corresponding external object approaches the antenna radiator 540. Therefore, the electronic device 501 may detect, using the second sensor 420 (e.g., at least one of an acceleration sensor, a gyro sensor, or a geomagnetic sensor), an orientation of the electronic device 501, in which the external object approaches the antenna radiator 540.

When the detected orientation of the electronic device is not a first surface (e.g., the first surface FF) direction, that is, one of the rear surface BF direction and the side surface SF direction, the electronic device 501 may up-regulate the predetermined threshold value (Th) (e.g., first threshold value).

According to an embodiment, the up-regulated threshold value (Th) (e.g., second threshold value) is a value equal to or smaller than the smaller value (e.g., 22000) between the amounts of changes in capacitance of cases where the approach of a human body is detected in one of the rear surface BF direction and the side surface SF direction, and may be configured to be a value equal to or greater than the greater value (e.g., 9400) between the amounts of changes in capacitance of cases where the approach of an object except for a human body is detected in one of the rear surface BF direction and the side surface SF direction. For example, the up-regulated threshold value (Th) (e.g., second threshold value) may be configured to be "18000" as shown in [TABLE 1].

In this case, when the detected orientation is the front surface FF direction, the electronic device 501 may maintain the predetermined threshold value (e.g., first threshold value) corresponding to the front surface FF direction. Further, the electronic device 501 compares the amount of change in capacitance corresponding to the front surface FF with the predetermined threshold value (e.g., first threshold value) to determine the external object to be a human body when the amount of change in the capacitance corresponding to the front surface FF is greater than the predetermined threshold value (Th) (e.g., first threshold value), so as to perform an output power back off operation for decreasing output power of the antenna radiator 540. Further, when the amount of change in the capacitance corresponding to the front surface FF is equal to or smaller than the predetermined threshold value (Th) (e.g., first threshold value), the electronic device 501 may determine the external object (e.g., a desk) to be an object except for a human body, so that the output power back off operation is not performed.

Also, when the detected orientation is a direction except for the front surface FF (i.e., one of the rear surface BF direction and the side surface SF direction), the device 501 may up-regulate the predetermined threshold value (Th) (e.g., first threshold value) corresponding to the direction to be predetermined times thereof (e.g., about three times). Then, the electronic device 501 compares the amount of change in capacitance corresponding to the direction with the predetermined threshold value (e.g., second threshold value (Th=18000)) to determine the external object to be a human body when the amount of change in the capacitance corresponding to the direction is greater than the predetermined threshold value (Th) (e.g., second threshold value), so as to perform an output power back off operation for decreasing output power of the antenna radiator 540. Further, when the amount of change in the capacitance corresponding to the direction is equal to or smaller than the predetermined threshold value (Th) (e.g., second threshold value), the electronic device 501 may determine the external object to be an object (e.g., a desk) except for a human body, so that the output power back off operation is not performed.

Accordingly, the electronic device 501 may adjust the predetermined threshold value according to the detected orientation (e.g., up-regulating from a first threshold value to a second threshold value) to decrease output power of the antenna radiator 540 as much as the amount of an output power back off value when the external object is a human body, so as to minimize the influence of the output power on the human body.

Meanwhile, an example of an SAR measurement value according to an orientation of the electronic device (i.e., the amount of change (e.g., second signal output value) in capacitance between the external object and the antenna radiator 540), an SAR measurement value amplified by a predetermined multiple according to the orientation (e.g., a third signal) of the electronic device, a threshold value (e.g., third threshold value) predetermined according to the orientation of the electronic device with respect to the SAR measurement value, whether or not an output power back off operation for decreasing output power from the antenna radiator 540 according to the orientation of the electronic device is performed, etc., are summarized in [TABLE 2] below.

TABLE 2

| | Touch surface | Amount of change in capacitance (delta) (up-regulated amount of change in capacitance) | Threshold | Whether or not PWR back off operates |
|---|---|---|---|---|
| Daisy SAR equipment (human body) | Front | 7000~9000 (e.g., 8000*3 = 24000) | 18000 | Operating |
| | Side | 27000~29000 | 18000 | Operating |
| | Back (rear) | 21000~23000 | 18000 | Operating |
| Desk | Front | 2000~4000 ((e.g., 3000*3 = 9000)) | 18000 | Not operating |
| | Side | 8500~9500 | 18000 | Not operating |
| | Back (rear) | 5000~6000 | 18000 | Not operating |

Referring to [TABLE 2], the amount of change (e.g., second signal output value) in capacitance between an external object (e.g., a human body or an object except for a human body (e.g., a desk)) and the antenna radiator 540 may be measured to have different values according to a direction in which the external object 408 approaches the electronic device. For example, when the external object approaches in the front surface FF direction of the electronic device, that is, an approaching direction of the external object is detected to be the front surface FF of the electronic device, it can be perceived that the amount of change in the capacitance is relatively smaller than that of a case where the approaching direction of the external object is detected to be a direction except for the front surface FF, that is, the side surface SF direction and the rear surface BF direction.

According to an embodiment, the predetermined threshold value (Th) (e.g., third threshold value) may be configured to be equal to or smaller than the amount of change in capacitance (e.g., 21000-23000) in a case where the approach of a human body has been detected in a direction except for the front surface FF of the electronic device, that is, one of the rear surface BF direction and the side surface SF direction, and configured to be equal to or greater than the amount of change in capacitance (e.g., 85000-95000) in a case where the approach of an object except for a human body (e.g., a desk) has been detected in a direction except for the front surface FF of the electronic device, that is, one of the rear surface BF direction and the side surface SF direction. For example, the predetermined threshold value (Th) (e.g., third threshold value) may be configured to be "18000" as shown in [TABLE 2]. When the predetermined threshold value (Th) (e.g., third threshold value) is configured to be "18000", the electronic device may compare the amount of change in capacitance due to the external object that approaches in one of the rear surface BF direction and the side surface SF direction with the predetermined threshold value (Th) (e.g., third threshold value), so as to determine whether the external object is a human body or not. In this case where the external object approaches in the front surface FF direction of the electronic device, and the amount of change in capacitance (e.g., 8000) due to the external object that approaches in the front surface FF direction of the electronic device is compared to the predetermined threshold value (Th) (e.g., third threshold value (Th=18000)), the electronic device may not determine whether the external object is a human body or not. Therefore, when it is determined that the external object approaches in the front surface FF of the electronic device according to the detected orientation of the electronic device 501, the electronic device 501 may compare a value (e.g., 8000*3=24000) which is up-regulated to a predetermined times (e.g., three times) of the amount of change in the capacitance (e.g., 8000) with the predetermined threshold value (Th) (e.g., third threshold value (Th=18000)), so as to determine whether the external object is a human body or not. For example, the electronic device 501 may determine the external object to be a human body when a value, in which the amount of change in capacitance due to the external object that approaches in the front surface FF of the electronic device is amplified by a predetermined multiple (e.g., about three times), is greater than the predetermined threshold value (Th) (e.g., third threshold value (Th=18000)), and determine the external object to be an object (e.g., a desk), i.e., not a human body, except for a human body when a value (e.g., 3000*3=9000), in which the amount of change in capacitance due to the external object that approaches in the front surface FF of the electronic device is amplified by a predetermined multiple (e.g., about three times), is smaller than the predetermined threshold value (Th) (e.g., third threshold value (Th=18000)).

In this case, when the detected orientation is the front surface FF direction, the electronic device 501 may control the amount of change in capacitance corresponding to the front surface FF direction to be amplified by a predetermined multiple (e.g., about three times). Further, the electronic device 501 may compare the amount of change in the capacitance corresponding to the front surface FF with the predetermined threshold value (e.g., third threshold value), and determine the external object to be a human body when the amount (e.g., 24000) of change in amplified capacitance corresponding to the front surface FF is greater than the predetermined threshold value (e.g., third threshold value (Th=18000)) so as to perform an output power back off operation for decreasing output power of the antenna radiator 540, and determine the external object to be an object except for a human body (e.g., a desk) when the amount (e.g., 9000) of change in amplified capacitance is equal to or smaller than the predetermined threshold value (e.g., third threshold value (Th=18000)) so that the output power back off operation is not performed.

Further, when the detected orientation is a direction except for the front surface FF (i.e., one of the rear surface BF direction and the side surface SF direction), the electronic device 501 may control the amount of change in the capacitance corresponding to the direction to be maintained. Further, the electronic device 501 may compare the amount of change in the capacitance corresponding to the direction with the predetermined threshold value (e.g., third threshold value), and determine the external object to be a human body when the amount (e.g., 28000 or 22000) of change in capacitance corresponding to the direction is greater than the predetermined threshold value (e.g., third threshold value (Th=18000)) so as to perform an output power back off operation for decreasing output power of the antenna radiator 540, and determine the external object to be an object except for a human body (e.g., a desk) when the amount (e.g., 9400 or 7000) of change in capacitance is equal to or smaller than the predetermined threshold value (e.g., third threshold value (Th=18000)) so that the output power back off operation is not performed.

Accordingly, the electronic device 501 may adjust the amount of change in the capacitance according to the detected orientation to decrease output power of the antenna radiator 540 as much as the amount of an output power back off value when the external object is a human body, so as to minimize the influence of the output power on the human body.

Further, an example of an SAR measurement value according to a distance between the antenna radiator 540 and a human body (i.e., the amount of change in capacitance between the antenna radiator 540 and a human body (e.g., second signal output value)), a threshold value (Th) predetermined differentially according to the distance (e.g., fourth threshold value), an output power back off value for decreasing output power (e.g., a first signal) from the antenna radiator 540 according to the distance, etc., are summarized in [TABLE 3] below.

TABLE 3

| | Distance to dielectric constant (Daisy SAR, human body) | | | | |
| --- | --- | --- | --- | --- | --- |
| | 5 mm | 4 mm | 3 mm | 2 mm | 1 mm |
| Whether to pass or fail Limb SAR, using maximum power | Pass | Pass | Pass | Fail | Fail |
| Amount of change in capacitance (threshold) | 145~155 | 245~255 (200) | 350~450 (325) | 650~750 (550) | 1100~1300 (950) |
| First sensor recognition | X | ○ | ○ | ○ | ○ |
| Power back off value of output power from antenna radiator | 0 dB | 0.3~0.5 dB | 0.9~1.2 dB | 1.5~1.7 dB | 2-2.5 dB |

Referring to [TABLE 3], the amount of change in capacitance is measured differentially according to the distance between the antenna radiator 540 of the electronic device and the external object (e.g., a human body or an object except for a human body). In [TABLE 3], the external object is assumed to be a human body. For example, it can be perceived that the amount of change in the capacitance gradually becomes larger as the distance decreases. Further, it can be perceived that the predetermined threshold value (Th) (e.g., fourth threshold value) is also configured differentially according to the distance. For example, it can be perceived that the predetermined threshold value (Th) (e.g., fourth threshold value) is configured to gradually become larger as the distance decreases. It can be also perceived that an output power back off value of output power from the antenna radiator 540 gradually becomes larger as the distance decreases. Accordingly, the strength of the output power decreases as much as the amount of the corresponding output power back off value as the distance decreases. For example, the electronic device 501 may determine the distance between the antenna radiator 540 and a human body, based on the measured amount of change in capacitance. The electronic device 501 may compare the amount of change in capacitance corresponding to the determined distance with a threshold value (e.g., fourth threshold value) predetermined according to the determined distance. For example, in a case where the determined distance is assumed to be 4 mm, based on the result of the comparison, when the amount (e.g., 245-255) of change in capacitance corresponding to the determined distance is greater than a threshold value (e.g., a fourth threshold value (Th=200)) predetermined in response to the determined distance, the electronic device 501 performs an output power back off operation to decrease output power of the antenna radiator 540 in response to the determined distance, and when the amount (e.g., 245-255) of change in capacitance corresponding to the determined distance is equal to or smaller than a threshold value (e.g., a fourth threshold value (Th=200)) predetermined in response to the determined distance, the output power back off operation to decrease output power of the antenna radiator 540 is not performed.

Accordingly, the electronic device 501 may differentially configure the predetermined threshold value (e.g., fourth threshold value) with respect to the amount of change in the capacitance according to the determined distance to decrease output power of the antenna radiator 540 as much as the amount of an output power back off value configured differentially according to the determined distance, so as to minimize the influence of the output power on the human body while maximizing the performance of the antenna radiator 540.

According to various example embodiments, an electronic device may comprise: a housing including a first surface, a second surface facing in the opposite direction of the first surface, and side surfaces that surround at least a part of a space between the first surface and the second surface; a first sensor and a second sensor which are disposed inside the housing or exposed through at least one surface; a communication circuit disposed inside the housing; an antenna radiator electrically connected with the communication circuit; and a control circuit electrically connected with at least one sensor of the first and second sensors, and the communication circuit, wherein the control circuit may be configured to: transmit or receive, to or from an external device, a first signal output from the communication circuit, using the antenna radiator; detect, using the first sensor, whether an external object has approached or is within a predetermined distance of at least a part of the antenna radiator to generate a second signal; detect, using the second sensor, an orientation of the electronic device to generate a third signal; and decrease the strength of the first signal based on at least a part of the generated second signal and third signal.

According to various example embodiments, the control circuit may be configured to determine an orientation of the electronic device based on the generated third signal, compare the second signal with a first threshold value when the determined orientation is a first direction, and compare the second signal with a second threshold value which is greater than the first threshold value when the determined orientation is a second direction.

According to various example embodiments, the control circuit may be configured to compare the second signal with a third threshold value which is greater than the first threshold value when the orientation is a third direction between the first direction and the second direction.

According to various example embodiments, based on the result of the comparison, when the second signal is greater than the compared first or second threshold value, the control circuit may be configured to decrease the strength of the first signal, and maintain the strength of the first signal when the second signal is equal to or smaller than the compared first or second threshold value.

According to various example embodiments, the control circuit may be configured such that the second signal includes a value between the first threshold value and the second threshold value when the external object has a selected dielectric constant, the strength of the first signal is decreased when the determined orientation is the first direction, and the strength of the first signal is maintained when the determined orientation is the second direction.

According to various example embodiments, the control circuit may be configured to determine an orientation of the electronic device based on the generated third signal, amplify the size of the second signal to compare the same with a threshold value when the orientation is the first direction, and compare the second signal with the threshold value, without amplifying the second signal, when the orientation is the second direction.

According to various embodiments, the first sensor may include a grip sensor.

According to various embodiments, the first sensor may be disposed adjacent to the antenna radiator.

According to various embodiments, the second sensor may include at least one of an acceleration sensor, a gyro sensor, and a geomagnetic sensor.

According to various embodiments, an electronic device may include: a housing including a first surface facing a first direction, a second surface facing a second direction that is opposite to the first direction, and side surfaces that surround at least a part of a space between the first surface and the second surface; a first sensor and a second sensor which are disposed inside the housing or exposed through at least one surface; a communication circuit disposed inside the housing; an antenna radiator electrically connected with the communication circuit; and a control circuit electrically connected with at least one of the first and second sensors, the communication circuit, and the antenna radiator, wherein the control circuit may be configured to: transmit or receive a first signal to or from an external device, using the communication circuit; detect, using the first sensor, whether an external object has approached or is within a predetermined distance of at least a part of the antenna radiator to generate a second signal; detect, using the second sensor, whether the external object has approached at least some of surfaces of the housing to generate a third signal; and determine whether or not to decrease the strength of the first signal based on the generated second signal and third signal.

According to various embodiments, the control circuit may be configured to determine a surface toward which the external object has approached among the surfaces of the housing, based on the generated third signal, compare the second signal with a first threshold value when the determined surface is the first surface, and compare the second signal with a second threshold value greater than the first threshold value when the determined surface is the second surface.

According to various embodiments, when the determined surface is the side surface, the control circuit may be configured to compare the second signal with the second threshold value or a third threshold value greater than the second threshold value.

According to various embodiments, based on the result of the comparison, the control circuit may be configured to decrease the strength of the first signal when the second signal is greater than the first threshold value or the second threshold value, and maintain the strength of the first signal when the second signal is equal to or smaller than the first threshold value or the second threshold value.

According to various embodiments, the control circuit may be configured such that the second signal include a value between the first threshold value and the second threshold value when the external object has a selected dielectric constant, the strength of the first signal is decreased when the determined surface is the first surface, and the strength of the first signal is maintained when the determined surface is the second surface or the side surface.

According to various embodiments, the control circuit is configured to determine a surface toward which the external object has approached among surfaces of the housing, based on the generated third signal, amplify the size of the second signal to compare the same with a threshold value when the determined surface is the first surface, and compare the second signal with the threshold value, without amplifying the second signal, when the determined surface is the second surface.

According to various embodiments, the second sensor may include at least one of a touch sensor, a proximity sensor, an illuminance sensor, and an image sensor.

According to various embodiments, the control circuit may be configured to determine a distance to the external object based on the second signal.

According to various embodiments, the control circuit may be configured to compare the second signal with a fourth threshold value predetermined according to a distance, based on the determined distance.

According to various embodiments, based on the result of the comparison, the control circuit may be configured to decrease the strength of the first signal when the second signal is greater than the fourth threshold value, and maintain the strength of the first signal when the second signal is equal to or smaller than the fourth threshold value.

According to various embodiments, the control circuit may be configured to differentially decrease the strength of the first signal as the determined distance decreases.

Figure 6:
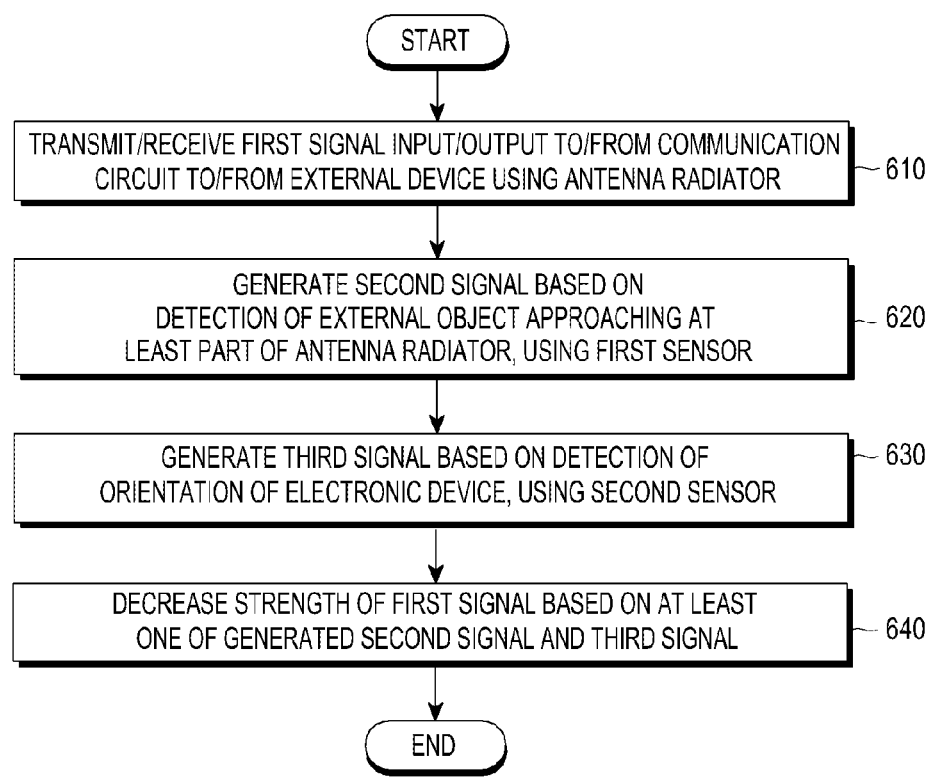
FIG. 6 is a flowchart illustrating an example output power back off control method in an electronic device according to various example embodiments.

FIG. 6 is a flowchart illustrating an example output power back off control method in an electronic device according to various example embodiments. The output power back off control method in the electronic device may include operations 610 to 640. The output power back off control method in the electronic device may be performed by the electronic device (e.g., the electronic device 401), the processor (e.g., the processor 120, 210) of the electronic device, or the control circuit (e.g., the control circuit 450) of the electronic device.

In operation 610, for example, the electronic device may transmit or receive a first signal (e.g., a communication signal) input/output from/to a communication circuit to or from an external device, using an antenna radiator. For example, the first signal (e.g., output power from the antenna radiator) output from the communication circuit may be transmitted to the external device (e.g., the external device 102, 104), using the antenna radiator.

According to an embodiment, the first signal may include a communication signal. The communication signal, for example, may include a mobile communication signal. When the first signal is transmitted, electromagnetic waves harmful for a human body may be emitted from the antenna radiator. As the strength of the first signal becomes stronger, the size of the electromagnetic waves may become greater.

In operation 620, for example, the electronic device may generate, using a first sensor, a second signal by the external object that approaches or is within a predetermined distance of at least a part of the antenna radiator. For example, the electronic device may sense the amount of change in capacitance according to the approach of the external object towards the electronic device, and generate a second signal (e.g., a grip sensing signal) having the sensed amount of change in the capacitance as an output value.

According to an embodiment, the first sensor may include at least one of a grip sensor, a proximity sensor, and a motion sensor.

According to an embodiment, the electronic device may determine whether or not an external object (e.g., a human body or an object except for a human body) approaches at least a part of the antenna radiator, based on the generated second signal. For example, the electronic device may compare an output value (e.g., the measured amount of change in capacitance) of the second signal with a threshold value (Th) (e.g., first threshold value) predetermined for the amount of change in capacitance. Based on the result of the comparison, it may be determined that the external object has approached at least a part of the antenna radiator when the output value of the second signal is greater than the predetermined threshold value (Th) (e.g., first threshold value), and it may be determined that the external object has not approached at least a part of the antenna radiator when the output value of the second signal is equal to or smaller than the predetermined threshold value (Th) (e.g., first threshold value).

In operation 630, for example, the electronic device may detect an approaching or contact direction toward which the external object approaches or is in contact with the electronic device, using a second sensor. For example, when the external object approaches or is in contact with the electronic device, the electronic device may detect a direction toward which the external object approaches or is in contact with the electronic device, through at least one of an acceleration value, geomagnetic value, and gyro sensing value of the electronic device, and output a third signal including information on the detected direction. For example, the electronic device may determine a direction toward which the external object that approaches the antenna radiator, using at least of an acceleration value, a geomagnetic value, and a gyro sensing value which have been detected through the second sensor. That is, the electronic device may detect an orientation (e.g., at least one of the front surface FF, the rear surface BF, and the side surface SF direction) of the electronic device, in which the external object is detected, so as to generate a third signal (e.g., a direction sensing signal) including information on the detected orientation.

According to an embodiment, the second sensor may include at least one of an acceleration sensor, a gyro sensor, and a geomagnetic sensor. The second sensor is not limited to the above description, and a sensor capable of detecting a direction in which an external object approaches or is in contact with at least a part of the antenna radiator, that is, a direction (orientation) of the electronic device with respect to an approaching or contacting external object may be available.

In operation 640, for example, the electronic device may decrease the strength of the first signal, based on at least one of the generated second signal and third signal. For example, when it is determined that the external object has approached the antenna radiator based on the second signal, the electronic device may determine a direction toward which the external object approaches based on the third signal, so as to compare a threshold value (Th) predetermined according to the orientation with an output value of the second signal. Here, the electronic device may adjust the threshold value (Th) predetermined in response to the corresponding orientation or adjust the output value of the second signal, so as to decrease the strength of the first signal without a malfunction of the first sensor 10.

A method for decreasing the strength of the first signal will be described in greater detail below, with reference to FIGS. 7 to 9.

Figure 7:
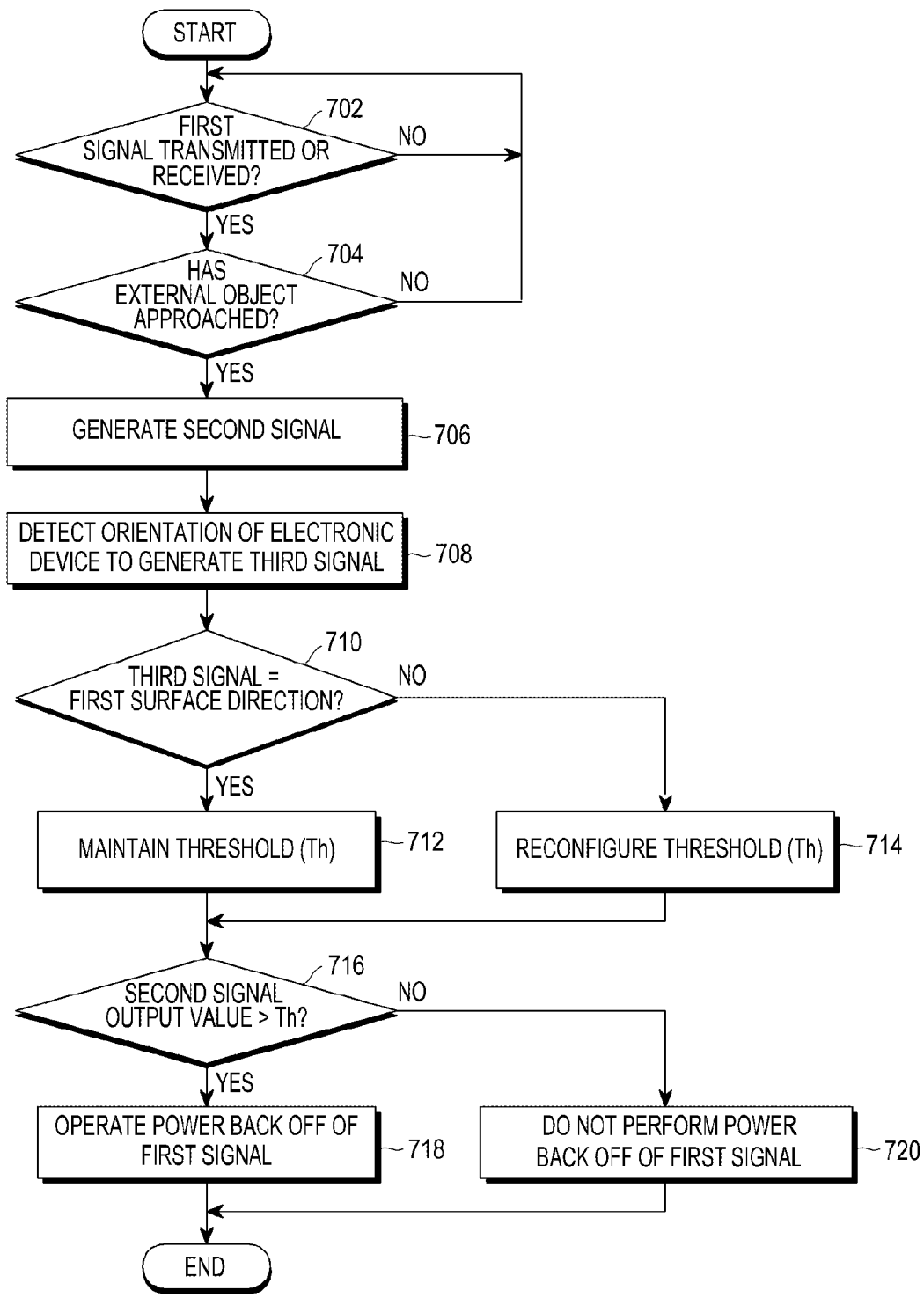
FIG. 7 is a flowchart illustrating an example output power back off control method in an electronic device according to various example embodiments.

FIG. 7 is a flowchart illustrating an example output power back off control method in an electronic device according to various example embodiments. For example, FIG. 7 is a flowchart illustrating a method for adjusting a threshold value (Th) predetermined according to an orientation of the electronic device so as to decrease the strength of a first signal (e.g., output power of an antenna radiator), and the output power back off control method in an electronic device may include operations 702 to 720. The output power back off control method in an electronic device may be performed by the electronic device (e.g., the electronic device 401), the processor (e.g., the processor 120, 210) of the electronic device, or the control circuit (e.g., the control circuit 450) of the electronic device.

In operation 702, for example, the electronic device may determine whether a first signal (e.g., output power from an antenna radiator) is transmitted or received to or from an external device (e.g., the external device 102, 104). The electronic device may perform operation 704 when the first signal is transmitted or received, and may repeat operation 702 regularly or irregularly when the first signal is not transmitted or received.

According to an embodiment, when an antenna radiator is a mobile communication antenna, a communication circuit may transmit or receive the first signal to or from the external device (e.g., the external device 102, 104) through one of various mobile communications including cellular communication, LTE communication, 3G communication, WiBro communication, WIMAX communication, etc.

In operation 704, for example, the electronic device may determine, using a first sensor, whether an external object (e.g., a human body or an object except for a human body) approaches at least a part of the antenna radiator. The electronic device may perform operation 706 when an external object approaches at least a part of the antenna radiator, and may repeat operation 702 regularly or irregularly when an external object does not approach at least a part of the antenna radiator.

According to an embodiment, the first sensor may include at least one of a grip sensor, a proximity sensor, and a motion sensor.

According to an embodiment, the electronic device may detect the amount of change in capacitance, through the first sensor. The electronic device may determine that an external object has approached at least a part of the antenna radiator when the detected amount of change in capacitance exceeds a predetermined threshold value, and determine that an external object has not approached at least a part of the antenna radiator when the detected amount of change in capacitance is smaller than a predetermined threshold value.

In operation 706, for example, the electronic device may generate a second signal according to detection of an external object that approaches at least a part of the antenna radiator, using the first sensor.

According to an embodiment, the electronic device may generate a second signal (e.g., a grip sensing signal) having the amount of change in capacitance detected by the first sensor when an external object has approached at least a part of the antenna radiator, using the first sensor.

In operation 708, for example, the electronic device may detect, using a second sensor, an orientation of the electronic device corresponding to the detected direction toward which an external object has approached, so as to generate a third signal.

According to an embodiment, the second sensor may include at least one of an acceleration sensor, a gyro sensor, and a geomagnetic sensor. The second sensor is not limited to the above description, and a sensor capable of detecting an orientation of the electronic device corresponding to a direction toward which an external object approaches at least a part of the antenna radiator may be available.

According to an embodiment, the third signal may include information on the detected orientation of the electronic device.

In operation 710, for example, the electronic device may determine an orientation of the electronic device, corresponding to a direction toward which the external object approaches. For example, the electronic device may determine whether orientation information of the electronic device included in the third signal is a first surface (e.g., the front surface FF direction). The electronic device may perform operation 712 when the detected orientation information of the electronic device is a first surface direction, and may perform operation 714 when the detected orientation information of the electronic device is not a first surface direction (e.g., a second surface (e.g., one of the rear surface BF and the side surface SF)).

In operation 712, for example, the electronic device may maintain a threshold value (Th) (e.g., first threshold value) predetermined for a second signal output value.

According to an embodiment, the predetermined threshold value (Th) (e.g., first threshold value) may be configured to be equal to or smaller than a second signal output value (e.g., 8000) in a case where the approach of a human body in the front surface FF direction of the electronic device is detected, and configured to be equal to or greater than a second signal output value (e.g., 3000) in a case where the approach of an object except for a human body in the front surface FF direction of the electronic device is detected. For example, the predetermined threshold value (Th) (e.g., first threshold value) may be configured to be "6000".

In operation 714, for example, the electronic device may up-regulate, with respect to a second signal output value, the predetermined threshold value (Th) (e.g., first threshold value) to a predetermined times (e.g., about three times) thereof, so as to reconfigure the same.

According to an embodiment, the up-regulated threshold value (Th) (e.g., second threshold value) may be configured to be a value equal to or smaller than the smaller value (e.g., 22000) among second signal output values of a case where the approach of a human body toward one of the rear surface BF direction and side surface SF direction of the electronic device is detected, and a value equal to or greater than the greater value (e.g., 9400) among second signal output values of a case where the approach of an object (e.g., a desk) except for a human body toward one of the rear surface BF direction and side surface SF direction of the electronic device is detected. For example, the up-regulated threshold value (Th) (e.g., second threshold value) may be configured to be "18000" which is about three times the predetermined threshold value (Th) (e.g., first threshold value). In the present disclosure, the up-regulated threshold value (Th) (e.g., second threshold value) has been configured to be three times the predetermined threshold value (Th) (e.g., first threshold value) but is not limited thereto. Further, it is possible to configure the up-regulated threshold value to be multiple of various numbers of the predetermined threshold value.

In operation 716, for example, the electronic device may determine whether the second signal output value is greater than the predetermined threshold value (e.g., first threshold value or an up-regulated threshold value (e.g., second threshold value)). The electronic device may perform operation 718 when the second signal output value is greater than the predetermined threshold value (e.g., first threshold value or an up-regulated threshold value (e.g., second threshold value)), and perform operation 720 when the second signal output value is equal to or smaller than the predetermined threshold value (e.g., first threshold value or an up-regulated threshold value (e.g., second threshold value)).

In operation 718, for example, the electronic device may perform an output power back off operation for the first signal. The electronic device may decrease the strength of the first signal as much as the amount of an output power back off value, by performing such operation. Accordingly, when a human body approaches in the front surface SF direction of the electronic device, the electronic device may decrease the strength of the first signal transmitted or received to or from an external device (e.g., the external device 102, 104) through the antenna radiator. Therefore, the electronic device may be able to minimize the influence of electromagnetic waves generated from the antenna radiator, on a human body.

In operation 720, for example, the electronic device may not perform an output power back off operation for the first signal, and maintain the strength of the first signal. Therefore, when a human body approaches in a direction except for the front surface FF, i.e., one of the rear surface BF direction and side surface SF direction of the electronic device, the electronic device may transmit or receive the first signal to or from an external device (e.g., the external device 102, 104) while maintaining, without deteriorating, performance of the antenna radiator, by maintaining the strength of the first signal.

Figure 8:
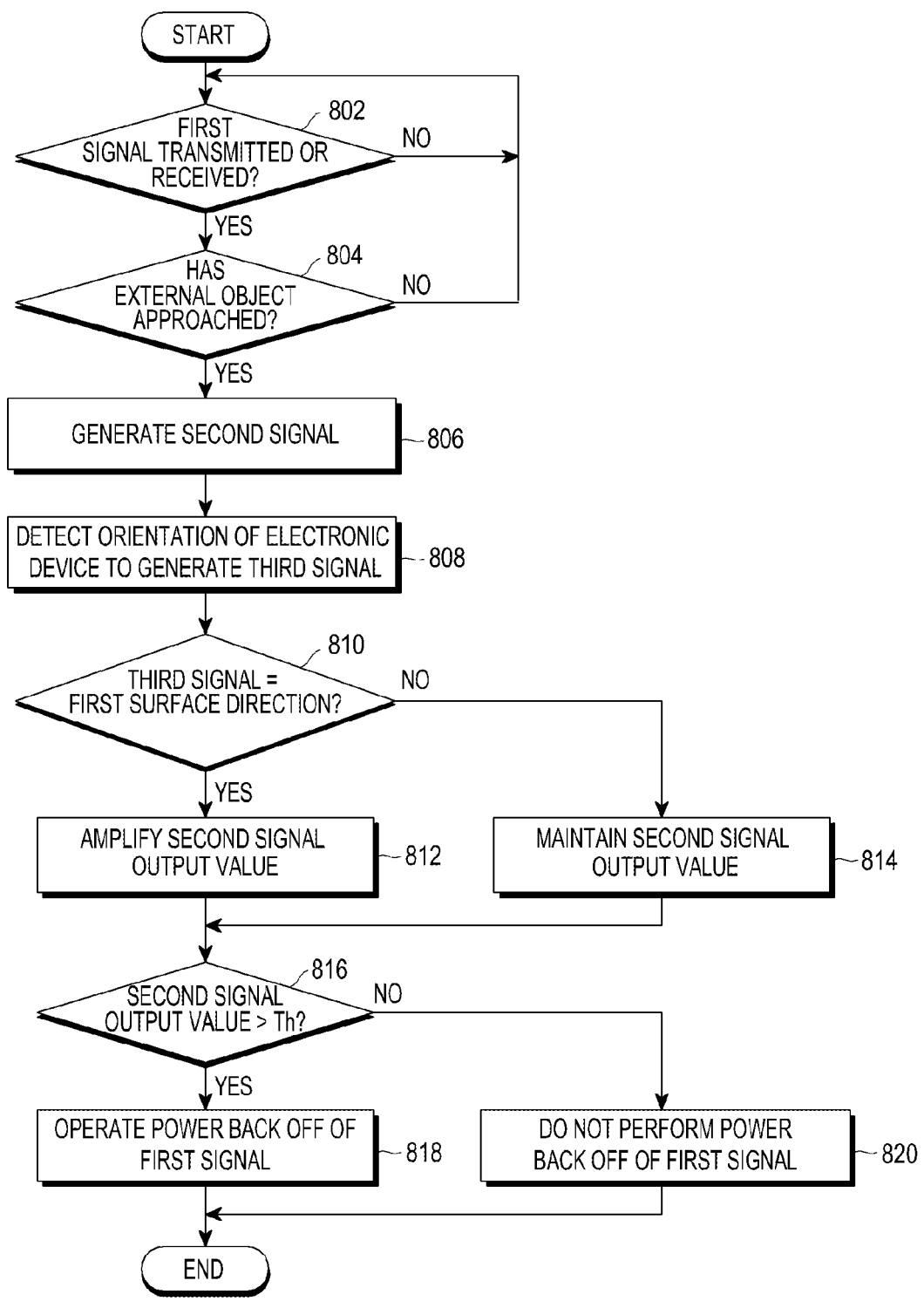
FIG. 8 is a flowchart illustrating an example output power back off control method in an electronic device according to various example embodiments.

FIG. 8 is a flowchart illustrating an example output power back off control method of an electronic device according to various example embodiments. For example, FIG. 8 is a flowchart illustrating a method for decreasing the strength of a first signal (e.g., output power from an antenna radiator) by adjusting the gain of a second signal output value (e.g., the amount of change in capacitance between a human body and an antenna radiator) according to an orientation of the electronic device, and an output power back off control method in an electronic device may include operations 802 to 820. The output power back off control method in an electronic device may be performed by the electronic device (e.g., the electronic device 401), the processor (e.g., the processor 120, 210) of the electronic device, or the control circuit (e.g., the control circuit 450) of the electronic device.

In operation 802, for example, the electronic device may determine whether a first signal (e.g., output power from an antenna radiator) is transmitted or received to or from an external device (e.g., the external device 102, 104). The electronic device may perform operation 804 when the first signal is transmitted or received, and repeat operation 802 regularly or irregularly when the first signal is not transmitted or received.

According to an embodiment, when an antenna radiator is a mobile communication antenna, a communication circuit may transmit or receive the first signal to or from an external device (e.g., the external device 102, 104) through one of various mobile communications including cellular communication, LTE communication, 3G communication, WiBro communication, WIMAX communication, etc.

In operation 804, for example, the electronic device may determine whether an external object (e.g., a human body or an object except for a human body) approaches at least a part of the antenna radiator, using a first sensor. The electronic device may perform operation 806 when an external object approaches at least a part of the antenna radiator, and repeat operation 802 regularly or irregularly when an external object does not approach at least a part of the antenna radiator.

According to an embodiment, the first sensor may include at least one of a grip sensor, a proximity sensor, and a motion sensor.

According to an embodiment, the electronic device may detect the amount of change in capacitance through the first sensor. The electronic device may determine that an external object has approached at least a part of the antenna radiator when the detected the amount of change in capacitance exceeds a predetermined threshold value (Th) (e.g., third threshold value), and determine that an external object has not approached at least a part of the antenna radiator when the detected the amount of change in capacitance is smaller than a predetermined threshold value (Th) (e.g., third threshold value).

In operation 806, for example, the electronic device may generate a second signal according to detection of an external object that approaches at least a part of the antenna radiator, using the first sensor.

According to an embodiment, when it is determined, through the first sensor, that an external object has approached at least a part of the antenna radiator, the electronic device may generate a second signal (e.g., a grip sensing signal) having, as an output value, the amount of change in capacitance detected by the first sensor.

In operation 808, for example, the electronic device may detect, using a second sensor, an orientation of the electronic device corresponding to a direction toward which the detected external object approaches, so as to generate a third signal.

According to an embodiment, the second sensor may include at least one of an acceleration sensor, a gyro sensor, and a geomagnetic sensor. The second sensor may not be limited to the above description, and a sensor capable of detecting an orientation of the electronic device corresponding to a direction toward which an external object approaches at least a part of the antenna radiator may be available.

According to an embodiment, the third signal may include the detected orientation information of the electronic device.

In operation 810, for example, the electronic device may determine an orientation of the electronic device, corresponding to a direction toward which the external object approaches. For example, the electronic device may determine whether orientation information of the electronic device included in the third signal is a first surface (e.g., the front surface FF direction). The electronic device may perform operation 812 when the detected orientation information of the electronic device is a first surface direction, and perform operation 814 when the detected orientation information of the electronic device is not a first surface direction (e.g., a second surface (e.g., one of the rear surface BF and the side surface SF)).

In operation 812, for example, the electronic device may amplify the second signal output value to a predetermined times thereof.

According to an embodiment, the predetermined threshold value (Th) (e.g., third threshold value) may be configured to be a value equal to or smaller than the smaller value (e.g., 22000) among second signal output values of a case where the approach of a human body in a direction except for the front surface FF of the electronic device, i.e., one of the rear surface BF direction and the side surface SF direction is detected, and a value equal to or greater than the greater value (e.g., 9400) among second signal output values of a case where the approach of an object (e.g., a desk) except for a human body in a direction except for the front surface FF of the electronic device, i.e., one of the rear surface BF direction and the side surface SF direction is detected. For example, the predetermined threshold value (Th) (e.g., third threshold value) may be configured to be "18000". In the present disclosure, the amplified second signal output value due to the external object that approaches in the front surface FF direction of the electronic device has been configured to be three times the second signal output value, but is not limited thereto. Further, it is possible to configure the amplified second signal output value to be multiple of various numbers of the second signal output value.

In operation 814, for example, the electronic device may maintain the second signal output value.

In operation 816, for example, the electronic device may determine whether the second signal output value (or the second signal output value amplified to predetermined times thereof) is greater than the predetermined threshold (Th) value (e.g., third threshold value). The electronic device may perform operation 818 when the second signal output value (or the second signal output value amplified predetermined times thereof) is greater than the predetermined threshold (Th) value (e.g., third threshold value), and perform operation 820 when the second signal output value (or the second signal output value amplified to predetermined times thereof) is equal to or smaller than the predetermined threshold (Th) value (e.g., third threshold value).

In operation 818, for example, the electronic device may perform an output power back off operation for the first signal. The electronic device may decrease the strength of the first signal as much as an output power back off value, by performing such operation. Accordingly, when a human body approaches in the front surface FF direction of the electronic device, the electronic device may decrease the strength of the first signal transmitted or received to or from an external device (e.g., the external device 102, 104) through the antenna radiator. Therefore, the electronic device may minimize the influence of electromagnetic waves generated from the antenna radiator, on a human body.

In operation 820, for example, the electronic device may not perform an output power back off operation for the first signal, and maintain the strength of the first signal. Therefore, when a human body approaches in a direction except for the front surface FF of the electronic device, i.e., one of the rear surface BF direction and the side surface SF direction, the electronic device may transmit or receive the first signal to or from an external device (e.g., the external device 102, 104) while maintaining, without deteriorating, performance of the antenna radiator 440, by maintaining the strength of the first signal.

Figure 9:
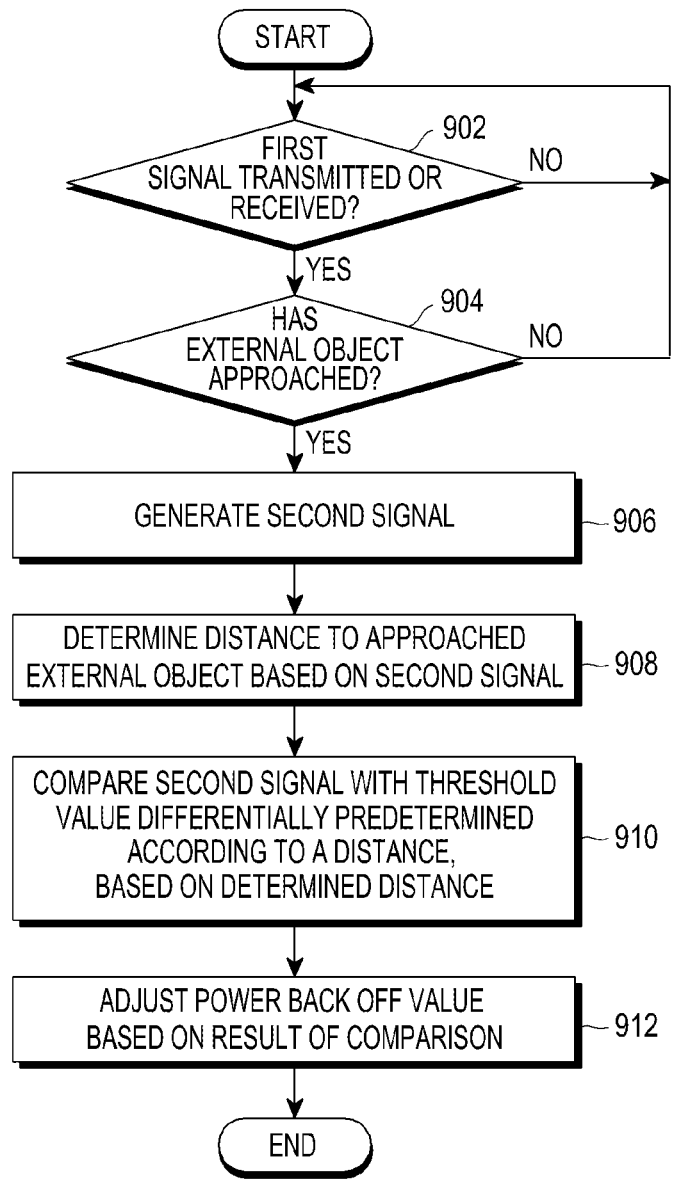
FIG. 9 is a flowchart illustrating an example output power back off control method in an electronic device according to various example embodiments.

FIG. 9 is a flowchart illustrating an example output power back off control method in an electronic device according to various example embodiments. For example, FIG. 9 is a flowchart illustrating a method for differentially decreasing the strength of the first signal (e.g., output power of an antenna radiator) by differentially configuring a threshold value predetermined according to a distance to an object (e.g., a human body or an object except for a human body) that approaches an electronic device, and an output power back off control method in an electronic device may include operations 902 to 912. The output power back off control method in an electronic device may be performed by the electronic device (e.g., the electronic device 401), the processor (e.g., processor 120, 210) of the electronic device, or the control circuit (e.g., the control circuit 450) of the electronic device. In the present disclosure, the external object is assumed to be a human body.

In operation 902, for example, the electronic device may determine whether a first signal (e.g., output power of an antenna radiator) is transmitted or received to or from an external device (e.g., the external device 102, 104). The electronic device may perform operation 904 when the first signal is transmitted or received, and repeat operation 902 regularly or irregularly when the first signal is not transmitted or received.

According to an embodiment, when an antenna radiator is a mobile communication antenna (or a main antenna), a communication circuit may transmit or receive the first signal to or from the external device (e.g., the external device 102, 104) through one of various mobile communications including cellular communication, LTE communication, 3G communication, WiBro communication, WIMAX communication, etc.

In operation 904, for example, the electronic device may determine, using a first sensor, whether an external object (e.g., a body) approaches at least a part of the antenna radiator 440. The electronic device may perform operation 906 when the external object approaches at least a part of the antenna radiator, and repeat operation 902 regularly or irregularly when the external object does not approach at least a part of the antenna radiator.

According to an embodiment, the first sensor may include at least one of a grip sensor, a proximity sensor, and a motion sensor.

According to an embodiment, the electronic device may detect the amount of change in capacitance through the first sensor. The electronic device may determine that an external object has approached at least a part of the antenna radiator when the detected amount of change in capacitance exceeds a predetermined threshold value (Th) (e.g., fourth threshold value), and determine that an external object has not approached when the detected amount of change in capacitance is equal to or smaller than a predetermined threshold value (Th) (e.g., fourth threshold value).

In operation 906, for example, the electronic device may generate a second signal according to detection of an external object that approaches at least a part of the antenna radiator, using the first sensor.

According to an embodiment, when it is determined, through the first sensor, that an external object has approached at least a part of the antenna radiator, the electronic device may generate a second signal (e.g., a grip sensing signal) having, as an output value, the amount (Delta) of change in capacitance detected by the first sensor.

In operation 908, the electronic device may determine a distance to the approached external object, based on the second signal. For example, the electronic device may determine, using the first sensor, a distance to an external object that approaches in the front surface FF direction of the electronic device, based on the second signal output value, that is, the amount (Delta) of change in capacitance between the antenna radiator and the external object (e.g., a human body) that approaches in the front surface FF of the electronic device.

In operation 910, for example, the electronic device may compare the second signal with a corresponding threshold value (Th) (e.g., fourth threshold value) predetermined differentially according to a distance, based on the determined distance. For example, as shown in [TABLE 3], when the distance is determined as 4 mm, the electronic device may compare the second signal output value (e.g., 245-255) measured in the distance 4 mm with the threshold value (e.g., a fourth threshold value (Th=200)) corresponding to the distance 4 mm. Based on the result of the comparison, the electronic device may determine that a human body has approached in the front surface FF direction of the electronic device when the second signal output value is greater than the predetermined threshold value (e.g., fourth threshold value), and the electronic device may determine that a human body has not approached in the front surface FF direction of the electronic device when the second signal output value is equal to or smaller than the predetermined threshold value (Th) (e.g., fourth threshold value).

In operation 912, for example, the electronic device may adjust, according to the result of the comparison, an output power back off value of the first signal configured differentially according to the determined distance. For example, the electronic device may decrease the strength of the first signal as much as the amount of an output power back off value predetermined differentially according to the determined distance.

According to an embodiment, the electronic device may have an output power back off value of the first signal, which becomes greater as the determined distance decreases. Accordingly, the electronic device may differentially decrease the strength of the first signal as much as the amount of the output power back off value, as the determined distance decreases.

According to various embodiments, an output power back off control method in an electronic device may include the operations of: transmitting or receiving, to or from an external device, a first signal output from a communication circuit disposed inside a housing of the electronic device, using an antenna radiator electrically connected with the communication circuit; detecting, using a first sensor disposed inside the housing or exposed through at least one surface, whether an external object has approached or is within a predetermined distance of at least a part of the antenna radiator to generate a second signal; detecting, using a second sensor disposed inside the housing or exposed through at least one surface, an orientation of the electronic device to generate a third signal; and decreasing the strength of the first signal, based on at least some of the generated second signal and third signal.

According to various embodiments, the output power back off control method in an electronic device may further include the operations of: determining an orientation of the electronic device, based on the generated third signal; comparing the second signal with a first threshold value when the determined orientation is a first direction; and comparing the second signal with a second threshold value greater than the first threshold value when the determined orientation is a second direction.

According to various embodiments, the output power back off control method in an electronic device may further include an operation for comparing the second signal with a third threshold value greater than the first threshold value when the orientation is a third direction between the first direction and the second direction.

According to various embodiments, the decreasing the strength of the first signal may include the operations of, based on the result of the comparison: decreasing the strength of the first signal when the second signal is greater than the compared first or second threshold value; and maintaining the strength of the first signal when the second signal is equal to or smaller than the compared first or second threshold value.

According to various embodiments, the decreasing the strength of the first signal may include the operations of, based on the result of the comparison: including, by the second signal, a value between the first threshold value and the second threshold value when the external object has a selected dielectric constant, and decreasing the strength of the first signal when the determined orientation is the first direction; and maintaining the strength of the first signal when the determined orientation is the second direction.

According to various embodiments, the output power back off control method in an electronic device may further include the operations of: determining an orientation of the electronic device, based on the generated signal; amplifying the strength of the second signal and comparing the same with a first threshold value when the orientation is the first direction; and comparing the second signal with the first threshold value, without amplifying the second signal, when the orientation is the second direction.

According to various embodiments, the first sensor may include a grip sensor.

According to various embodiments, the first sensor may be disposed adjacent to the antenna radiator.

According to various embodiments, the second sensor may include at least one of an acceleration sensor, a gyro sensor, and a geomagnetic sensor.

According to various embodiments, an output power back off control method in an electronic device may include the operations of: transmitting or receiving a first signal to or from an external device, using a communication circuit disposed inside a housing of the electronic device; detecting, using a first sensor disposed inside the housing or exposed through at least one surface, whether an external object has approached at least a part of the antenna radiator electrically connected with the communication circuit so as to generate a second signal; detecting, using a second sensor disposed inside the housing or exposed through at least one surface, whether the external object has approached at least some of surfaces of the housing so as to generate a third signal; and determining whether or not to decrease the strength of the first signal, based on the generated second signal and third signal.

According to various embodiments, the output power back off control method in an electronic device may further include the operations of: determining a surface toward which the external object has approached among surfaces of the housing, based on the generated third signal; comparing the second signal with a first threshold value when the determined surface is the first surface; and comparing the second signal with a second threshold value greater than the first threshold value when the determined surface is the second surface.

According to various embodiments, the output power back off control method in an electronic device may further include an operation for comparing the second signal with the second threshold value or a third threshold value greater than the second threshold value when the determined surface is the side surface.

According to various embodiments, the determining whether or not to decrease the strength of the first may include, based on the result of the comparison, the operations of: decreasing the strength of the first signal when the second signal is greater than the first threshold value or the second threshold value; and maintaining the strength of the first signal when the second signal is equal to or smaller than the first threshold value or the second threshold value.

According to various embodiments, the determining whether or not to decrease the strength of the first may include the operations of: including, by the second signal, a value between the first threshold value and the second threshold value when the external object has a selected dielectric constant, and decreasing the strength of the first signal when the determined surface is the first surface; and maintaining the strength of the first signal when the determined surface is the second surface.

According to various embodiments, the output power back off control method in an electronic device may further include the operations of: determining a surface toward which the external object has approached among surfaces of the housing, based on the generated third signal; amplifying the size of the second signal and comparing the same with a threshold value when the determined surface is the first surface; and comparing the second signal with the threshold value, without amplifying the second signal, when the determined surface is the second surface.

According to various embodiments, the second sensor may include at least one of a touch sensor, a proximity sensor, an illuminance sensor, and an image sensor.

According to various embodiments, the output power back off control method in an electronic device may further include a method for determining a distance to the external object, based on the second signal.

According to various embodiments, the output power back off control method may further include an operation for comparing the second signal with a fourth threshold value predetermined according to a distance, based on the determined distance.

According to various embodiments, the determining whether or not to decrease the strength of the first signal may include, based on the result of the comparison, the operations of: decreasing the strength of the first signal when the second signal is greater than the fourth threshold value; and maintaining the strength of the first signal when the second signal is equal to or smaller than the fourth threshold value.

According to various embodiments, the decreasing the strength of the first signal when the second signal is greater than the fourth threshold value may include an operation for differentially decreasing the strength of the first signal, as the determined distance becomes shorter.

The term "module" as used herein may, for example, refer to a unit including one of hardware (e.g., circuitry), software, and firmware or a combination of two or more of them. The "module" may be interchangeably used with, for example, the term "unit", "logic", "logical block", "component", or "circuit". The "module" may be a minimum unit of an integrated component element or a part thereof. The "module" may be a minimum unit for performing one or more functions or a part thereof. The "module" may be mechanically or electronically implemented. For example, the "module" according to the present disclosure may include at least one of processing circuitry (e.g., including a CPU), an Application-Specific Integrated Circuit (ASIC) chip, a Field-Programmable Gate Arrays (FPGA), and a programmable-logic device for performing operations which has been known or are to be developed hereinafter.

According to various embodiments, at least some of the devices (e.g., modules or functions thereof) or the method (e.g., operations) according to the present disclosure may be implemented by an instruction stored in a computer-readable storage medium in a programming module form. The instruction, when executed by a processor (e.g., the processor 120), may cause the one or more processors to execute the function corresponding to the instruction. The computer-readable storage medium may be, for example, the memory 130.

The computer readable recoding medium may include a hard disc, a floppy disk, magnetic media (e.g., a magnetic tape), optical media (e.g., a Compact Disc Read Only Memory (CD-ROM) and a Digital Versatile Disc (DVD)), magneto-optical media (e.g., a floptical disk), a hardware device (e.g., a Read Only Memory (ROM), a Random Access Memory (RAM), a flash memory), and the like. In addition, the program instructions may include high class language codes, which can be executed in a computer by using an interpreter, as well as machine codes made by a compiler. The aforementioned hardware device may be configured to operate as one or more software modules in order to perform the operation of the present disclosure, and vice versa.

The programming module according to the present disclosure may include one or more of the aforementioned components or may further include other additional components, or some of the aforementioned components may be omitted. Operations executed by a module, a programming module, or other component elements according to various embodiments of the present disclosure may be executed sequentially, in parallel, repeatedly, or in a heuristic manner. Further, some operations may be executed according to another order or may be omitted, or other operations may be added.

According to various embodiments, a computer-readable recording medium for storing instructions that are configured, by at least one processor, to perform at least one operation when executed by the at least one processor wherein the at least one operation may include the operations of: transmitting or receiving, to or from an external device, a first signal output from a communication circuit disposed inside a housing of the electronic device, using an antenna radiator electrically connected with the communication circuit; detecting, using a first sensor disposed inside the housing or exposed through at least one surface, whether an external object has approached or is within a predetermined distance of at least a part of the antenna radiator to generate a second signal; detecting, using a second sensor disposed inside the housing or exposed through at least one surface, an orientation of the electronic device s to generate a third signal; and decreasing the strength of the first signal, based on at least some of the generated second signal and third signal.

Various example embodiments disclosed herein are provided merely to easily describe technical details of the present disclosure and to aid in the understanding of the present disclosure, and are not intended to limit the scope of the present disclosure. Accordingly, the scope of the present disclosure should be construed as including all modifications or various other embodiments based on the technical idea of the present disclosure.

What is claimed is:

1. An electronic device comprising:
   a housing including a first surface, a second surface facing in the opposite direction of the first surface, and side surfaces that surround at least a part of a space between the first surface and the second surface;
   a first sensor and a second sensor disposed in the housing and/or exposed through at least one of the first, the second and the side surfaces;
   a communication circuit disposed in the housing;
   an antenna radiator electrically connected with the communication circuit; and
   a control circuit electrically connected with at least one sensor of the first and second sensors, and the communication circuit,
   wherein the control circuit is configured to:
      transmit and/or receive, to and/or from an external device, a first signal output from the communication circuit, using the antenna radiator;
      detect, using the first sensor, whether an external object has approached within a predetermined distance between the external object and at least a part of the antenna radiator to generate a second signal;
      detect, using the second sensor, an orientation of the electronic device toward which the external object approaches the electronic device to generate a third signal; and
      decrease a strength of the first signal, based on at least a portion of the generated second signal and third signal.

2. The electronic device of claim 1, wherein the control circuit is configured to:
   determine an orientation of the electronic device based on the generated third signal; compare the second signal with a first threshold value when the determined orientation is a first direction; and
   compare the second signal with a second threshold value greater than the first threshold value when the determined orientation is a second direction.

3. The electronic device of claim 2, wherein the control circuit is configured to compare the second signal with a third threshold value greater than the first threshold value when the orientation is a third direction between the first direction and the second direction.

4. The electronic device of claim 2, wherein the control circuit, based on the result of the comparison, is configured to decrease the strength of the first signal when the second signal is greater than the compared first or second threshold value, and to maintain the strength of the first signal when the second signal is equal to or smaller than the compared first or second threshold value.

5. The electronic device of claim 2, wherein the control circuit is configured to: include, by the second signal, a value between the first threshold value and the second threshold value when the external object has a predetermined dielectric constant; decrease the strength of the first signal when the determined orientation is the first direction; and maintain the strength of the first signal when the determined orientation is the second direction.

6. The electronic device of claim 1, wherein the control circuit is configured to: determine an orientation of the electronic device based on the generated third signal; amplify the second signal and compare the amplified second signal with a first threshold value when the orientation is the first direction; and compare the second signal with the first threshold value, without amplifying the second signal, when the orientation is the second direction.

7. The electronic device of claim 1, wherein the first sensor includes a grip sensor.

8. The electronic device of claim 1, wherein the first sensor is disposed adjacent to the antenna radiator.

9. The electronic device of claim 1, wherein the second sensor includes at least one of an acceleration sensor, a gyro sensor, and a geomagnetic sensor.

10. An electronic device comprising:
    a housing including a first surface facing a first direction, a second surface facing a second direction opposite the first direction, and side surfaces that surround at least a part of a space between the first surface and the second surface;
    a first sensor and a second sensor disposed in the housing or exposed through at least one of the first, the second and the side surfaces;
    a communication circuit disposed in the housing;
    an antenna radiator electrically connected with the communication circuit; and
    a control circuit electrically connected with at least one of the first and second sensors, the communication circuit, and the antenna radiator,
    wherein the control circuit is configured to:
       transmit and/or receive a first signal to and/or from an external device, using the communication circuit;
       detect, using the first sensor, whether an external object has approached within a predetermined distance between the external object and at least a part of the antenna radiator to generate a second signal;
       detect, using the second sensor, a location of the electronic device at which the external object approaches on least one surface of the housing to generate a third signal; and
       determine whether to decrease a strength of the first signal, based on the generated second signal and third signal.

11. The electronic device of claim 10, wherein the control circuit is configured to: determine a surface toward which the external object has approached from among surfaces of the housing, based on the generated third signal;
    compare the second signal with a first threshold value when the determined surface is the first surface; and
    compare the second signal with a second threshold value greater than the first threshold value when the determined surface is the second surface.

12. The electronic device of claim 11, wherein the control circuit is configured to compare the second signal with the second threshold value or to compare the second signal with a third threshold value greater than the second threshold value when the determined surface is the side surface.

13. The electronic device of claim 11, wherein the control circuit, based on the result of the comparison, is configured to decrease the strength of the first signal when the second signal is greater than the first threshold value or the second threshold value, and to maintain the strength of the first signal when the second signal is equal to or smaller than the first threshold value or the second threshold value.

14. The electronic device of claim 11, wherein the control circuit is configured to: include, by the second signal, a value between the first threshold value and the second threshold value when the external object has a predetermined dielectric constant; decrease the strength of the first signal when the determined surface is the first surface; and maintain the strength of the first signal when the determined surface is the second surface or the side surface.

15. The electronic device of claim 11, wherein the control circuit is configured to: determine a surface toward which the external object has approached from among surfaces of the housing, based on the generated third signal;
   amplify the size of the second signal and compare the amplified second signal with a threshold value when the determined surface is the first surface; and
   compare the second signal with the threshold value, without amplifying the second signal, when the determined surface is the second surface.

16. The electronic device of claim 10, wherein the second sensor includes at least one of a touch sensor, a proximity sensor, an illuminance sensor, and an image sensor.

17. The electronic device of claim 10, wherein the control circuit is configured to determine a distance to the external object, based on the second signal.

18. The electronic device of claim 17, wherein the control circuit is configured to compare the second signal with a predetermined fourth threshold value based on the determined distance.

19. The electronic device of claim 18, wherein the control circuit, based on the result of the comparison, is configured to decrease the strength of the first signal when the second signal is greater than the fourth threshold value, and to maintain the strength of the first signal when the second signal is equal to or smaller than the fourth threshold value.

20. The electronic device of claim 19, wherein the control circuit is configured to differentially decrease the strength of the first signal, as the determined distance becomes shorter.

* * * * *